(12) United States Patent
Briggs

(10) Patent No.: US 11,125,364 B2
(45) Date of Patent: Sep. 21, 2021

(54) SEALING DEVICE FOR FLANGES

(71) Applicant: LGC US ASSET HOLDINGS, LLC, Houston, TX (US)

(72) Inventor: Gary Briggs, Leeds (GB)

(73) Assignee: LGC US ASSET HOLDINGS, LLC, Houston, TX (US)

( * ) Notice: Subject to any disclaimer, the term of this patent is extended or adjusted under 35 U.S.C. 154(b) by 113 days.

(21) Appl. No.: 15/262,047

(22) Filed: Sep. 12, 2016

(65) Prior Publication Data

US 2017/0074437 A1 Mar. 16, 2017

Related U.S. Application Data

(60) Provisional application No. 62/216,710, filed on Sep. 10, 2015.

(51) Int. Cl.
*F16L 23/20* (2006.01)
*F16J 15/12* (2006.01)
(Continued)

(52) U.S. Cl.
CPC ............. *F16L 23/20* (2013.01); *F16J 15/122* (2013.01); *F16J 15/127* (2013.01);
(Continued)

(58) Field of Classification Search
CPC ......... F16J 15/127; F16J 15/122; F16L 23/20; F16L 23/18; F16L 23/003; F16L 23/22
(Continued)

(56) References Cited

U.S. PATENT DOCUMENTS 2,520,089 A * 8/1950 Lippincott ................ G01F 1/42
138/40
4,095,809 A * 6/1978 Smith .................... F16J 15/061
277/609
(Continued)

FOREIGN PATENT DOCUMENTS

DE 2756351 B1 * 5/1979 ............... F16J 15/12
DE 29 44 425 A1 5/1981
(Continued)

OTHER PUBLICATIONS

Clover, David and Reeves, David, "Advancements in Gaskets for HF Acid Alkylation". 15 pages. (2012).
(Continued)

*Primary Examiner* — Eugene G Byrd
(74) *Attorney, Agent, or Firm* — Alexander B. Uber; David G. Henry, Sr.

(57) ABSTRACT

Gaskets for sealing two mating surfaces have an inner ring positioned between two inner sealing deformable layers and an outer ring positioned exterior and concentric to the inner ring, the outer ring positioned between two outer sealing deformable layers. The two inner sealing deformable layers are configured to compress a greater amount than the two outer sealing deformable layers when a compressive force is applied. In a compressed configuration, the two inner sealing deformable layers fill in the crevices of the mating surfaces of a corroded flange connection thereby avoiding immediate maintenance for the damaged flanges. The inner and outer rings have grooves and ridges on upper and lower surfaces to retain and receive portions of the inner and outer sealing deformable layers in a sealed flange connection.

23 Claims, 15 Drawing Sheets

(51) Int. Cl.
*F16L 23/18* (2006.01)
*F16L 23/00* (2006.01)
*F16L 23/22* (2006.01)

(52) U.S. Cl.
CPC ............ *F16L 23/003* (2013.01); *F16L 23/18* (2013.01); *F16L 23/22* (2013.01)

(58) Field of Classification Search
USPC ....... 277/590, 591, 598, 644, 628, 608, 609, 277/637, 638, 650, 654, 630
See application file for complete search history.

(56) References Cited

U.S. PATENT DOCUMENTS

| | | | |
|---|---|---|---|
| 4,189,819 A * | 2/1980 | Nicholson | F16J 15/0887 29/417 |
| 4,575,917 A | 3/1986 | Kana et al. | |
| 4,673,187 A | 6/1987 | Hanson et al. | |
| 5,011,162 A * | 4/1991 | Jelinek | F01M 11/0408 277/644 |
| 5,118,121 A * | 6/1992 | Hellman, Sr. | F16J 15/0806 277/650 |
| 5,145,190 A | 9/1992 | Boardman | |
| 5,222,744 A * | 6/1993 | Dennys | F16L 23/22 277/608 |
| 5,511,797 A | 4/1996 | Nikirk et al. | |
| 5,645,284 A | 7/1997 | Fitton | |
| 5,664,791 A | 9/1997 | Owen | |
| 5,895,056 A * | 4/1999 | Habuta | F02F 11/002 277/591 |
| 6,367,803 B1 * | 4/2002 | Loth | F16L 23/18 277/321 |
| 6,932,352 B2 * | 8/2005 | Matsumoto | F02F 11/002 277/317 |
| 6,994,356 B2 * | 2/2006 | Veiga | F16J 15/061 277/616 |
| 7,455,301 B2 * | 11/2008 | Ragsdale | F16J 15/122 277/627 |
| 8,066,843 B2 | 11/2011 | Ragsdale et al. | |
| 9,890,859 B2 * | 2/2018 | Veiga | F16L 57/04 |
| 2004/0118510 A1 * | 6/2004 | Pollock | F16J 15/122 156/256 |
| 2007/0262538 A1 * | 11/2007 | Taguchi | F02F 11/002 277/598 |
| 2011/0115170 A1 * | 5/2011 | Krejci | F16J 15/122 277/647 |
| 2011/0156352 A1 * | 6/2011 | Bond | F16J 15/064 277/312 |
| 2012/0235365 A1 * | 9/2012 | Stubblefield | F16J 15/122 277/644 |
| 2013/0249171 A1 * | 9/2013 | Kolb | F16J 15/0806 277/608 |
| 2013/0328270 A1 * | 12/2013 | Stubblefield | F16J 15/122 277/314 |
| 2014/0042702 A2 | 2/2014 | Bond et al. | |
| 2014/0333035 A1 * | 11/2014 | Schemmann | F16J 15/02 277/602 |
| 2015/0060352 A1 * | 3/2015 | Yoder | B01D 35/28 210/456 |
| 2015/0330509 A1 * | 11/2015 | Malus | F16J 15/0887 277/608 |

FOREIGN PATENT DOCUMENTS

| | | | | |
|---|---|---|---|---|
| DE | 4139453 A1 * | 6/1992 | ............ F16J 15/121 |
| DE | 42 40 132 A1 | 1/1994 | |
| DE | 9490171 U1 * | 5/1995 | ............ F16J 15/104 |
| EP | 2607753 A1 * | 6/2013 | ............ F16J 15/064 |
| GB | 2 010 417 A | 6/1979 | |
| GB | 2010417 A * | 6/1979 | ............ F16J 15/121 |
| GB | 2 185 295 A | 7/1987 | |
| WO | WO 2016/003444 A1 | 1/2016 | |

OTHER PUBLICATIONS

Flexitallic Flange Rescue Gasket Brochure. Oct. 2014. [retrieved 07/08/0215]. 8 pages. Retrieved from the Internet: URL: http://www.flexitallic.eu/upload/brochures/FRG_Flange_Rescue_Gasket_Brochure.pdf.
International Patent Application PCT/GB2016/052813 Search Report and Written Opinion dated Dec. 7, 2016. 15 pages.
Machine Translation of German Patent Application 29 44 425 A1. 5 pages.
Machine Translation of German Patent Application 42 401 32 A1. 7 pages.

* cited by examiner

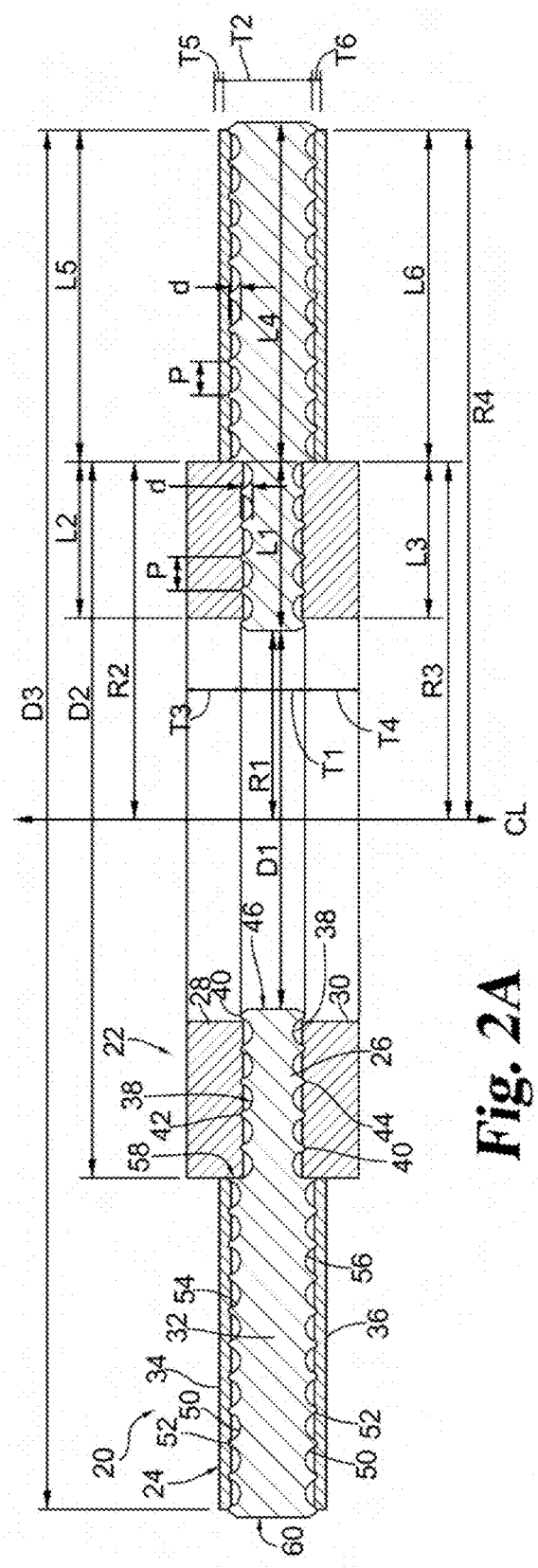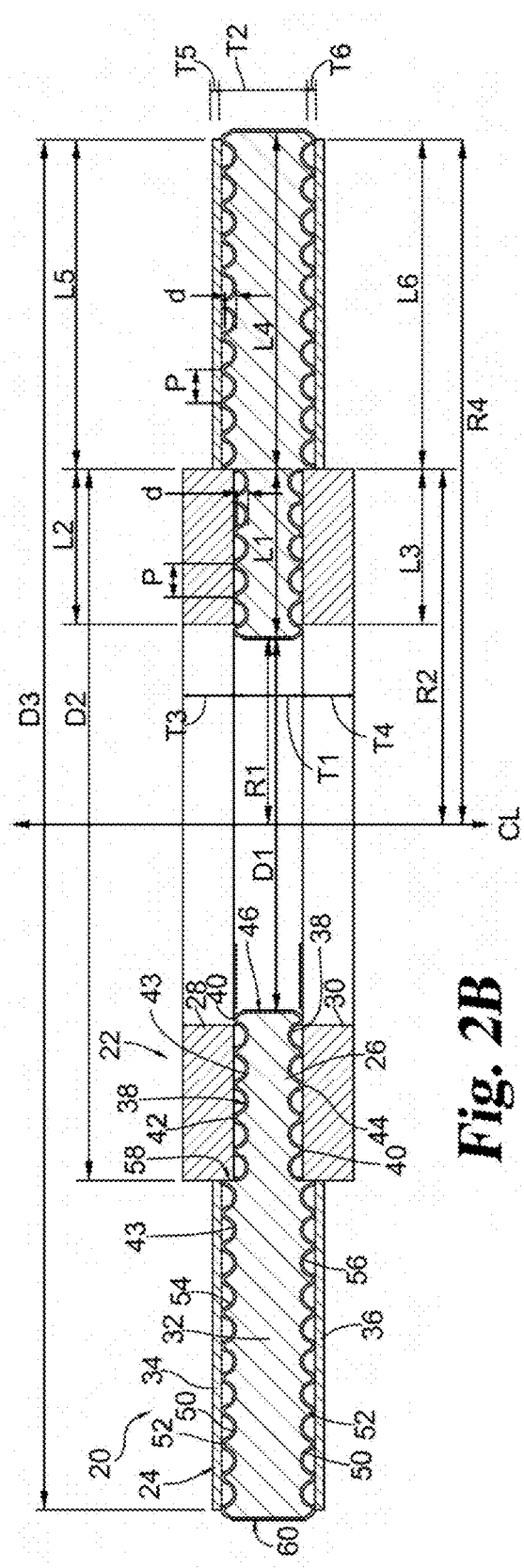

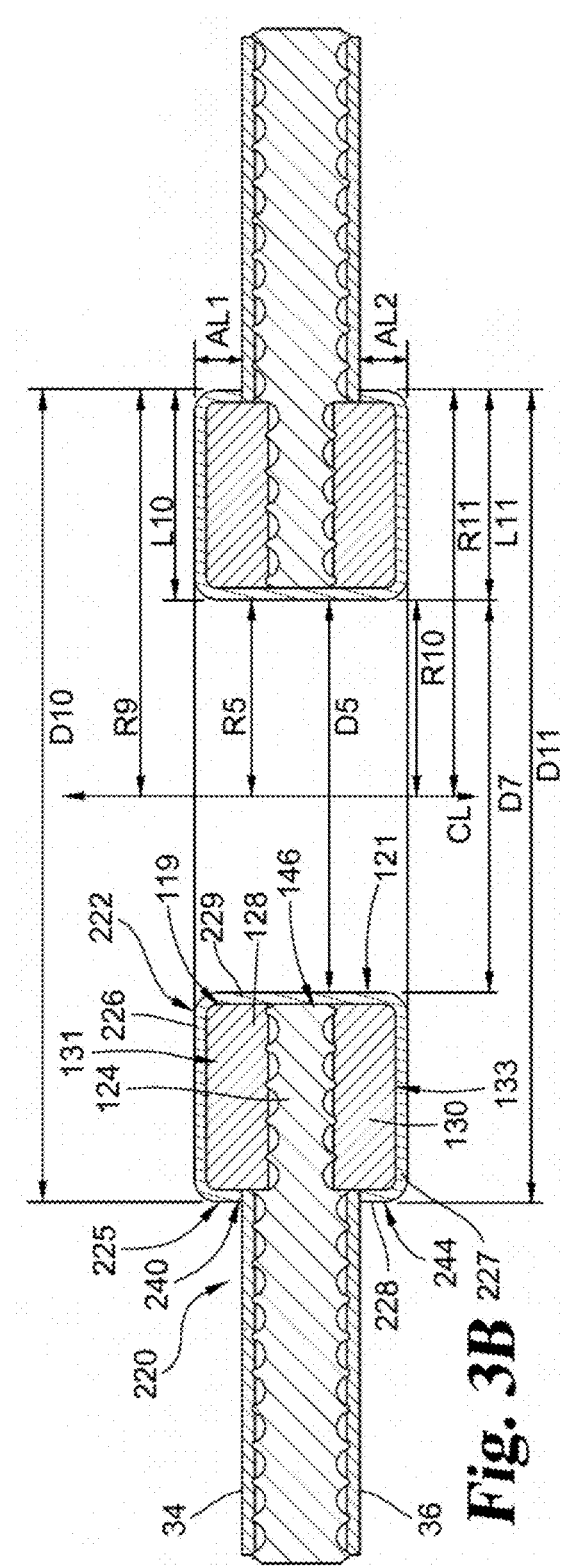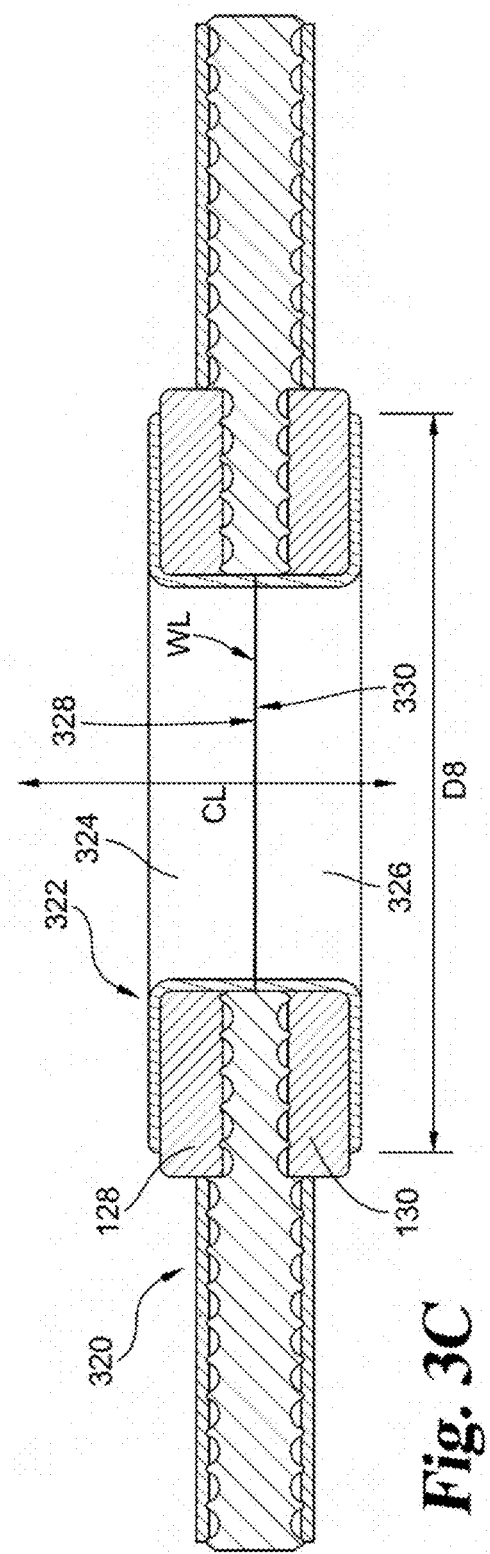

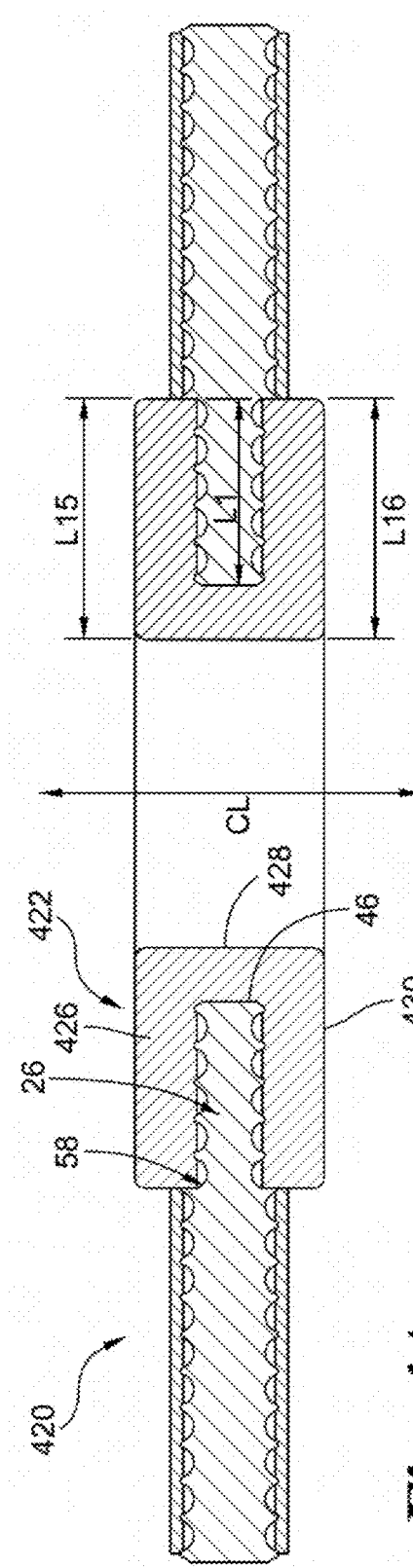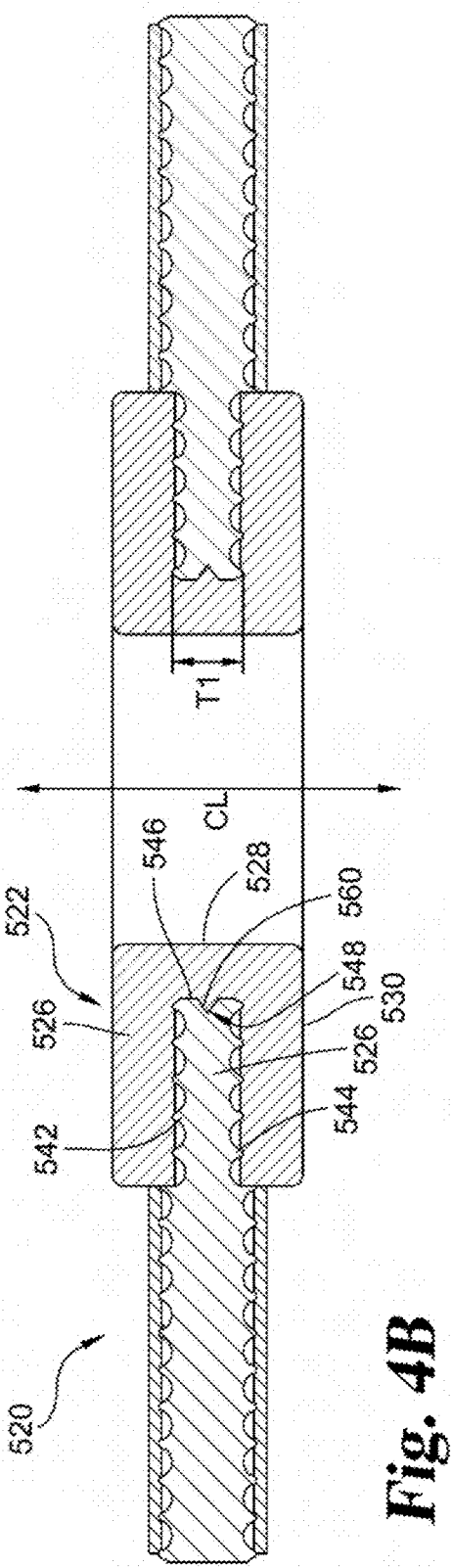

SEALING DEVICE FOR FLANGES

CROSS-REFERENCE TO RELATED APPLICATION

This application claims the benefit of U.S. Provisional Application No. 62/216,710 filed Sep. 10, 2015, which is hereby incorporated by reference.

BACKGROUND

The present invention relates generally to gaskets for sealing flange faces and more particularly, but not exclusively, to a gasket for sealing corroded or damaged flange faces of a joined flow conduit pipeline.

Sections of pipe are connected to form a pipeline to direct various fluids from one location to another. To facilitate connection of the pipes, flanges are formed on the ends which may be connected to a subsequent pipe flange using a plurality of fasteners, such as bolts. The gasket is inserted between the flanges to prevent fluid leakage. Bolted flange connections between joined flow conduit sections are typically considered temporary closures or connections that are frequently assembled and disassembled for routine maintenance. In one use, on mature oil fields, operators typically use water injection techniques to pressurize the oil wells and drive the oil to the surface. The water introduces an electrolyte medium which under certain conditions can lead to crevice type corrosion in and around the bore of the flanges. Under normal circumstances the corroded or damaged flange faces are not considered suitable for another gasket to be installed and the off-shore operator will have to decide whether to have the flanges re-machined or cut the flanges from the pipes and install new flanges. Some problems with any machining or welding process is that it is slow and time consuming, expensive, requires specialized people to be flown off-shore, and in the case of welding, a Hot Work Permit is also required.

Thus, there is a need for improvement in this field.

SUMMARY

One example embodiment of the present disclosure includes a gasket having an annular ring shape for sealing two mating surfaces includes an inner portion having an inner ring positioned between a first inner sealing deformable layer and a second inner sealing deformable layer, the inner ring having an upper surface opposite a lower surface, the inner ring having an alternating sequence of inner grooves and inner ridges along the upper surface and the lower surface, wherein the first inner sealing deformable layer is positioned on the upper surface and the second inner sealing deformable layer is positioned on the lower surface, and an outer portion positioned exterior and concentric to the inner portion, the outer portion having an outer ring positioned between a first outer sealing deformable layer and a second outer sealing deformable layer, wherein a non-compressed axial thickness of the inner portion is greater than a non-compressed axial thickness of the outer portion. In one aspect of the gasket the first and the second inner sealing deformable layers each have a compressibility between about 40% and about 70%, and the first and the second outer sealing deformable layers each have a compressibility between about 35% and about 50%. In a second aspect of the gasket a non-compressed axial thickness of the first and the second inner sealing deformable layers is greater than a non-compressed axial thickness of the first and the second outer sealing deformable layers. A non-compressed axial thickness of the outer ring may be greater than a non-compressed axial thickness of the inner ring.

In one aspect, the inner ring and the outer ring may be fabricated out of a metal material. In another aspect, the outer ring has an upper surface opposite a lower surface, the outer ring may have an alternating sequence of outer grooves and outer ridges along the upper surface and the lower surface of the outer ring, wherein the first outer sealing deformable layer is positioned on the upper surface and the second outer sealing deformable layer is positioned on the lower surface.

A method of sealing two substantially parallel surfaces includes positioning between the two substantially parallel surfaces a gasket according to the present disclosure and securing the two substantially parallel surfaces together to thereby deform the two inner sealing deformable layers against the two substantially parallel surfaces. The gasket may include a sealing envelope having an upper portion, a lower portion, and a middle portion that spans between the upper portion and the lower portion, wherein the upper portion contacts the first inner sealing deformable layer, the lower portion contacts the second inner sealing deformable layer, and the middle portion contacts an inner face of the inner ring. Further, the upper portion may have a radial length that is shorter than a radial length of the first inner sealing deformable layer. In one aspect, the first inner sealing deformable layer and the second inner sealing deformable layer are made of expandable PTFE, or flexible graphite or a combination of these materials.

Another example embodiment of the present disclosure includes a gasket having an annular ring shape for sealing two mating surfaces includes an inner ring having an upper surface opposite a lower surface and an inner face that spans between the upper and the lower surfaces, the inner ring having an alternating sequence of inner grooves and inner ridges along the upper surface and the lower surface. The gasket further includes a first inner sealing deformable layer positioned on the upper surface of the inner ring, the first inner sealing deformable layer configured to compress into the inner grooves when a compressive force is applied to the first inner sealing deformable layer, a second inner sealing deformable layer positioned on the lower surface of the inner ring, the second inner sealing deformable layer configured to compress into the inner grooves when a compressive force is applied to the second inner sealing deformable layer, and an outer ring positioned exterior and concentric to the inner ring, the outer ring having an upper surface opposite a lower surface and an outside face that spans between the upper surface and the lower surface. The gasket further includes a coating applied on the upper surface, lower surface, and the outside face of the outer ring, a first outer sealing deformable layer positioned over the coating on the upper surface of the outer ring, and a second outer sealing deformable layer positioned over the coating on the lower surface of the outer ring. In one aspect, the inner ring and the outer ring are fabricated out of a metal material. In another aspect, the deformable sealing envelope is fabricated out of expanded PTFE or flexible graphite material, or a combination of these materials. In yet another aspect, the first and the second outer sealing deformable layers are fabricated out of modified PTFE, biaxially orientated/microcellular PTFE, flexible graphite, mica, or silver material, or a combination of these materials. In one aspect, a coating is applied on the alternating sequence of inner grooves and inner ridges along the upper surface, the lower surface, and the inner face of the inner ring.

A gasket having an annular ring shape for sealing two mating surfaces according to the present disclosure includes an inner ring having an upper surface opposite a lower surface, the inner ring having an alternating sequence of inner grooves and inner ridges along the upper surface and the lower surface, a first inner sealing deformable layer positioned on the upper surface of the inner ring, the first inner sealing deformable layer configured to compress into the inner grooves when a compressive force is applied to the first inner sealing deformable layer, a second inner sealing deformable layer positioned on the lower surface of the inner ring, the second inner sealing deformable layer configured to compress into the inner grooves when a compressive force is applied to the second inner sealing deformable layer, an outer ring positioned exterior and concentric to the inner ring, the outer ring having an upper surface opposite a lower surface, the outer ring having an alternating sequence of outer grooves and outer ridges along the upper surface and the lower surface, a first outer sealing deformable layer positioned on the upper surface of the outer ring, the first outer sealing deformable layer configured to compress into the outer grooves when a compressive force is applied to the first outer sealing deformable layer, and a second outer sealing deformable layer positioned on the lower surface of the outer ring, the second outer sealing deformable layer configured to compress into the outer grooves when a compressive force is applied to the second outer sealing deformable layer. In one aspect, the first inner sealing deformable layer and the second inner sealing deformable layer are configured to compress a greater amount than the first outer sealing deformable layer and the second outer sealing deformable layer when a compressive force is applied to the first and the second inner sealing deformable layers and the first and the second outer sealing deformable layers. In a second aspect, the first and the second inner sealing deformable layers are configured to compress and fill a portion of the inner grooves of the upper surface and the lower surface, respectively, of the inner ring, and the first and the second outer sealing deformable layers are configured to compress and fill a portion of the outer grooves of the upper and the lower surfaces, respectively, of the outer ring. In another aspect, the first and the second inner sealing deformable layers are configured to compress and fill all of the inner grooves of the upper surface and the lower surface, respectively, of the inner ring. In any form, the first and the second inner sealing deformable layers can have a compressibility between about 40% and about 70%.

In one aspect, the gasket further includes a coating applied on the upper surface, lower surface, and the outside face of the outer ring and the coating is also applied on the upper surface, the lower surface, and the inner face of the inner ring. In another aspect, the coating is applied on the alternating sequence of outer grooves and outer ridges along the upper surface and the lower surface of the outer ring and the coating is also applied on the alternating sequence of inner grooves and inner ridges along the upper surface and the lower surface of the inner ring.

Any of the various features and structures of these embodiments and configurations can be combined into the gasket according to the present disclosure. Further forms, objects, features, aspects, benefits, advantages, and embodiments of the present invention will become apparent from a detailed description and drawings provided herewith.

BRIEF DESCRIPTION OF THE DRAWINGS

FIG. 2A is a cross-sectional view of the FIG. 1 gasket as viewed along line 2A-2A in FIG. 1.

FIG. 2B is a cross-sectional view of the FIG. 1 gasket having a coating.

FIG. 3B is a cross-sectional view of a gasket according to the present disclosure.

FIG. 3C is a cross-sectional view of a gasket according to the present disclosure.

FIG. 4A is a cross-sectional view of a gasket according to the present disclosure.

FIG. 4B is a cross-sectional view of a gasket according to the present disclosure.

DESCRIPTION OF THE SELECTED EMBODIMENTS

Figure 1:
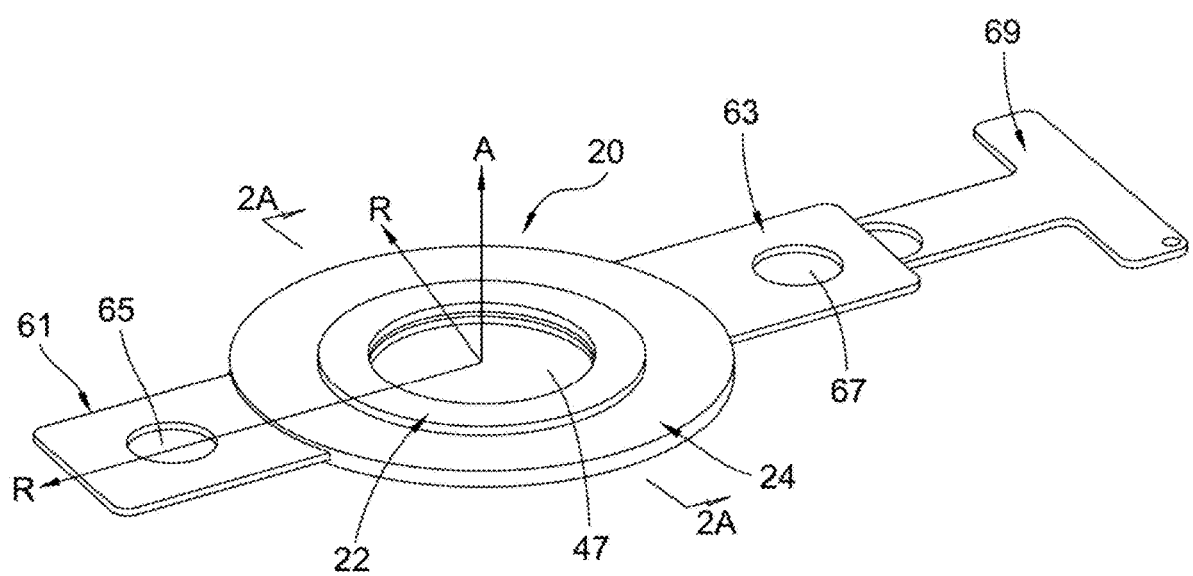
FIG. 1 is a top perspective view of a gasket according to the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail; although it will be apparent to those skilled in the relevant art that some features that are not relevant to describing the present invention may not be shown and/or described for the sake of clarity.

Figure 7:
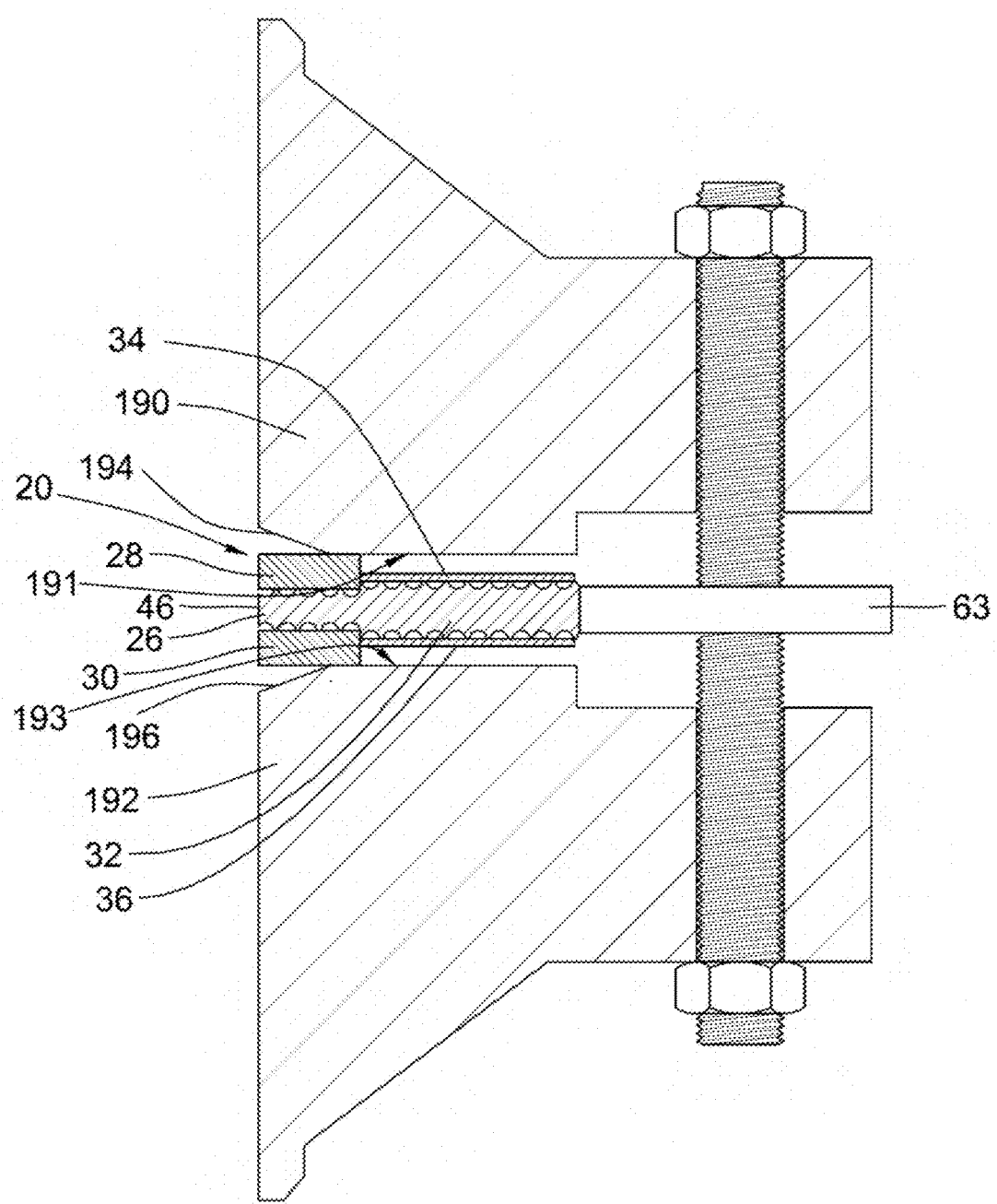
FIG. 7 is a partial cross-sectional view of the FIG. 1 gasket in a non-compressed configuration placed between corroded flange faces of flow conduit sections.
Figure 8:
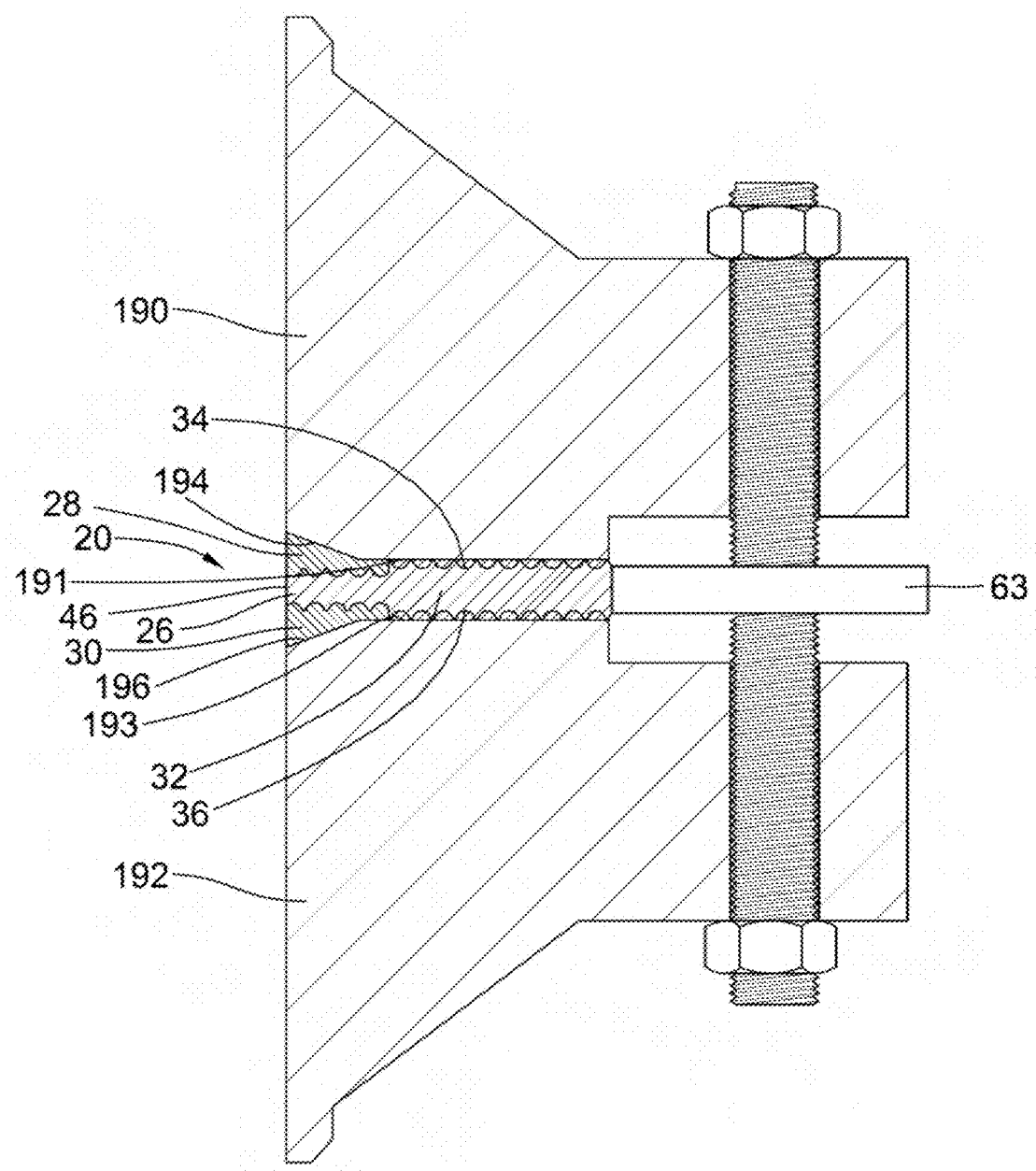
FIG. 8 is a view of the FIG. 7 embodiment in a compressed configuration placed between corroded flange faces of joined flow conduit sections.

Referring to FIGS. 1 and 2A, illustrated is a gasket 20 that can be placed between opposing flange faces of joined flow conduit sections. The gasket 20 is illustrated in a nominal state, that being ready for installation in a flow conduit in FIG. 2A. In particular, the gasket 20 is very beneficial in application with flange faces that have been subjected to crevice or galvanic corrosion attack (example damaged flange faces are illustrated in FIGS. 7 and 8) whereby the area where sealing takes place is not considered suitable for a traditional gasket to make a tight seal. For example, the gasket 20 is very beneficial for use between flange faces that became corroded due to exposure to corrosive media flowing in the flow conduit. The gasket 20 is constructed to fill the crevices, pits, and other deformations that appear on the flange faces to form an effective seal with an acceptable leakage rate to extend the joint life before replacement of the flange faces is required.

The gasket 20 having an annular ring shape includes an inner portion 22 adjacent and concentric to an outer portion 24. The inner portion 22 and the outer portion 24 may be formed from a single piece of material or the inner portion 22 and the outer portion 24 may be formed separately and attached together. The inner portion 22 having an annular ring shape includes an inner ring 26 positioned between a first inner sealing deformable layer 28 and a second inner sealing deformable layer 30. The outer portion 24 having an annular ring shape includes an outer ring 32 positioned between a first outer sealing deformable layer 34 and a second outer sealing deformable layer 36.

The inner ring 26 has an alternating sequence of inner grooves 38 and inner ridges 40 along an upper surface 42 and along a lower surface 44. The alternating sequence of inner grooves 38 and inner ridges 40 may form a kamm-profile, serrated, a corrugated, a Corrukamm™ of Lamons Gasket Company, or other roughened configuration. Alternatively, the upper surface 42 and the lower surface 44 may be substantially smooth or flat such that neither surface includes grooves and ridges although all of the benefits of the present invention may not be realized. The inner ridges 40 define a peak to peak distance P between two adjacent ridges 40 and the inner grooves 38 have a depth d. The peak to peak distance P between inner ridges 40 and depth d of the inner grooves 38 may vary; however, the peak to peak distance P of the inner ridges 40 and depth d of the inner grooves 38 are sufficient to receive compressive load or force such that the inner ring 26 can withstand a functional load. As such, the inner ring 26 is a structural member and forms a rigid seal. Moreover, the inner ring 26 is located relative to the outer ring 32 such that an equal amount or portion of the outer ring 32 extends beyond the upper surface 42 and the lower surface 44 of the inner ring 26 in both axial directions. For clarification and consistency throughout the application, axial direction shall mean the direction of fluid flow through the flow conduit and is denoted with arrow A in FIG. 1, while radial direction shall mean the direction that is radially outwardly from an axial centerline CL of the flow conduit and is denoted with arrow R in FIG. 1.

The inner ring 26 has an axial depth or thickness T1 that spans between the upper surface 42 and the lower surface 44 wherein the axial depth or thickness T1 is less than an axial depth or thickness T2 of the outer ring 32. The ratio of the axial depth or thickness T1 of the inner ring 26 to the axial depth or thickness T2 of the outer ring 32 is approximately 0.666. For example, the axial depth of the inner ring 26 is 2.0 millimeters and the axial depth of the outer ring 32 is 3.0 millimeters for a ratio of 0.666. In this example, the peak to peak distance P between inner ridges 40 is about 2.0 millimeters and the depth d of the inner grooves 38 is about 0.5 millimeters. Alternatively, the axial depth or thickness T1 of the inner ring 26 is 2.7, 3.3, 4.0, 4.7, 5.3, 6.0, or 6.7 millimeters, and the corresponding axial depth or thickness T2 of the outer ring 32 is 4.0, 5.0, 6.0, 7.0, 8.0, 9.0, or 10.0 millimeters, respectively, which yield a similar ratio of approximately 0.666. The ratio of the axial depth or thickness of the inner ring 26 to the axial depth or thickness of the outer ring 32 may be smaller or larger than 0.666 but is less than 1.0.

The inner ring 26 is circular or annular in shape and has an inside diameter D1 and an outside diameter D2 wherein an inside radius R1 is measured from a center CL of the inner ring 26 to an inner face 46 and an outside radius R2 is measured from the center CL of the inner ring 26 to an inner face 58 of the outer ring 32. The inside diameter D1 of the inner face 46 defines an aperture 47 that is substantially similar to or the same as the diameter or aperture of the through bores of the flange faces to which the gasket 20 will be inserted such that the inner face 46 is flush with the through bores of the flange faces. By extending the inner face 46 of inner ring 26 of the gasket 20 to the through bores of the flange faces when the gasket 20 is assembled with the flow conduit, the gasket 20 is easier to handle by the user during installation of the gasket 20. Moreover, the inner face 46 of the inner ring 26 being rigid is also easier to handle by the user during installation of the gasket 20. The inner ring 26 has a radial length L1 that spans from the inner face 46 of the inner ring 26 to the inner face 58 of the outer ring 32.

The inner ring 26 may be formed from any suitable material including, but not limited to, metal, carbon steel, stainless steel, alloys, polymers, composite materials, or a combination of these materials.

The first inner sealing deformable layer 28 has an axial depth or thickness T3 and a radial length L2, and the second inner sealing deformable layer 30 has an axial depth or thickness T4 and a radial length L3. Illustrated in FIG. 2A, the first inner sealing deformable layer 28 and the second inner sealing deformable layer 30 have the same axial depth or thickness T3 and T4, respectively, and the same radial lengths L2 and L3, respectively. The axial depth or thickness T3 of the first inner sealing deformable layer 28 may be different from the axial depth or thickness T4 of the second inner sealing deformable layer 30 when non-compressed. The first and second inner sealing deformable layers 28 and 30 are annular or circular in shape and sized to fit or rest on the upper and the lower surfaces 42 and 44, respectively, of the inner ring 26. The first inner sealing deformable layer 28 has a radial length L2 and the second inner sealing deformable layer 30 has a radial length L3 that each span between the inner face 46 of the inner ring 26 and the inner face 58 of the outer ring 32. Illustrated in FIG. 2A, the radial length L2 of the first inner sealing deformable layer 28 is less than the radial length L1 of the inner ring 26, and a radial length L3 of the second inner sealing deformable layer 30 is less than the radial length L1 of the inner ring 26. As such, the upper surface 42 and the lower surface 44 include one or more inner grooves 38 and/or inner ridges 40 that are not covered respectively with either the first inner sealing deformable layer 28 or the second inner sealing deformable layer 30 when non-compresssed. Alternatively, radial length L2 of the first inner sealing deformable layer 28 and the radial length L3 of the second inner sealing deformable layer 30 may each span or extend from the inner face 46 of the inner ring 26 to the inner face 58 of the outer ring 32. As such, the upper surface 42 is covered completely with the first inner sealing deformable layer 28 and the lower surface 44 is covered completely with the second inner sealing deformable layer 30. Radial length L2 of the first inner sealing deformable layer 28 may be the same, less than, or greater than the radial length L3 of the second inner sealing deformable layer 30.

Axial depths or thicknesses T3 and T4 of the first inner sealing deformable layer 28 and the second inner sealing deformable layer 30, respectively, are uniform across the radial lengths L2 and L3, respectively, of the layers 28 and 30. The axial depths or thicknesses T3 and T4 of the first inner sealing deformable layer 28 and the second inner sealing deformable layer 30 are between about 2.0 millimeters to about 8.0 millimeters, and in one form T3 and T4 of the first inner sealing deformable layer 28 and the second inner sealing deformable layer 30, respectively, are each 3.0 millimeters. Alternatively, axial depths or thicknesses T3 and T4 of the first inner sealing deformable layer 28 and the second inner sealing deformable layer 30, respectively, are non-uniform and may vary across the radial length L2 of the first inner sealing deformable layer 28 and the radial length L3 of the second inner sealing deformable layer 30, respectively. For example, the axial depth or thickness T3 and T4 of the first inner sealing deformable layer 28 and the second inner sealing deformable layer 30, respectively, may taper from a larger axial depth near the inner face 46 of the inner ring 26 to a smaller axial depth at the inner face 58 of the outer ring 32. Alternatively, the axial depth or thickness T3 and T4 of the first inner sealing deformable layer 28 and the second inner sealing deformable layer 30, respectively, taper from a smaller axial depth near the inner face 46 of the inner ring 26 to a larger axial depth at the inner face 58 of the outer ring 32. The axial depth or thickness T3 of the first inner sealing deformable layer 28 can be greater, smaller, or vary in some other manner than the axial depth or thickness T4 of the second inner sealing deformable layer 30.

The non-compressed axial depth or thickness T3 and T4 of the first inner sealing deformable layer 28 and the second inner sealing deformable layer 30, respectively, are each greater or larger than a non-compressed axial depth or thickness T5 and T6 of the first outer sealing deformable layer 34 and the second outer sealing deformable layer 36, respectively. The non-compressed axial depth or thickness T3 and T4 of the first inner sealing deformable layer 28 and the second inner sealing deformable layer 30, respectively, are also each greater or larger than the axial depth T1 of the inner ring 26. For example, the non-compressed axial depth T3 and T4 of the first inner sealing deformable layer 28 and the second inner sealing deformable layer 30, respectively, range from about 1½ times larger to about 2 times larger than the axial depth T1 of the inner ring 26. In one particular embodiment, the non-compressed axial depth T3 of the first inner sealing deformable layer 28 and non-compressed axial depth T4 of the second inner sealing deformable layer 30 are each 3.0 millimeters and the axial depth T1 of the inner ring 26 is 2.0 millimeters.

Materials for the first inner sealing deformable layer 28 and the second inner sealing deformable layer 30 include expanded PTFE, flexible graphite, or another highly compressible sealing material. In one embodiment the first inner sealing deformable layer 28 and the second inner sealing deformable layer 30 are made from expanded PTFE sold under the tradename Matrix L120 by Lamons Gasket Company. Whatever the material chosen for the first inner sealing deformable layer 28 and the second inner sealing deformable layer 30, it is softer than the material chosen for the first outer sealing deformable layer 34 and the second outer sealing deformable layer 36. For clarification and consistency throughout the application, a "softer" material shall be a material that will compress and deform a greater amount than another material with the same load per unit area applied. Therefore, the first inner sealing deformable layer 28 and the second inner sealing deformable layer 30 will compress and deform a greater amount than the first outer sealing deformable layer 34 and the second outer sealing deformable layer 36 under the same load per unit area. As such, during use when the gasket 20 is positioned between flange faces, compression of the first inner sealing deformable layer 28 and the second inner sealing deformable layer 30 is limited by the compression of the first outer sealing deformable layer 34, the second outer sealing deformable layer 36, and the outer ring 32. In other words, deformation of the first outer sealing deformable layer 34, the second outer sealing deformable layer 36, and the outer ring 32 limits compression of the first inner sealing deformable layer 28 and the second inner sealing deformable layer 30. The first inner sealing deformable layer 28 and the second inner sealing deformable layer 30 have compressibility between about 40% and about 70% as measured by ASTM F36 Method J by the America Society for Testing and Materials. The first inner sealing deformable layer 28 and the second inner sealing deformable layer 30 may be manufactured from expanded PTFE and have a compressibility of 55%. Alternatively, the first inner sealing deformable layer 28 and the second inner sealing deformable layer 30 are manufactured from flexible graphite and have a compressibility between 30% and 40%.

Turning now to the outer portion 24, the outer ring 32 has an alternating sequence of outer grooves 50 and outer ridges 52 along an upper surface 54 and along a lower surface 56. The alternating sequence of outer grooves 50 and outer ridges 52 may form a kammprofile, serrated, a corrugated, a Corrukamm™ of Lamons Gasket Company, or other roughened configuration. Alternatively, the upper surface 54 and the lower surface 56 are substantially smooth or flat such that neither surface includes grooves and ridges. The outer ridges 52 define a peak to peak distance P between two adjacent ridges and the outer grooves 50 have a depth d. The alternating sequence of outer grooves 50 and outer ridges 52 can continue to an outside face 60 of the outer ring 32 or the outer grooves 50 and the outer ridges 52 can terminate before reaching the outside face 60 to leave an outer border with a smooth, non-roughened surface profile on the outer ring 32.

The outer ring 32 is circular or annular in shape and has an inside diameter that corresponds to the outside diameter D2 of the inner ring 26. An inside radius R3 is measured from the center CL of the outer ring 32 to the inner face 58 of the outer ring 32. The outer ring 32 also has an outside diameter D3 that extends to the outside face 60 and a corresponding outside radius R4 that is measured from the center CL of the outer ring 32 to the outside face 60 of the outer ring 32. The outer ring 32 has an axial depth or thickness T2 that is greater than the axial depth or thickness T1 of the inner ring 26.

The outer ring 32 may be formed from any suitable material, including but not limited to, metal, carbon steel, stainless steel, alloys, polymers, or a composite material, or a combination of these materials.

Illustrated in FIG. 1, the outer portion 24 may include a pair of handling lugs 61, 63 extending outwardly from the outer ring 32 on opposite sides of the gasket 20. Each lug 61, 63 may be integral with the outer ring 32 or each lug 61, 63 may be welded onto the outer ring 32. Each lug 61, 63 has a centrally located hole 65, 67 to accommodate a fixing bolt (not illustrated) when locating the gasket 20 between the flange faces. The outer portion 24 also includes a sizing or product identification lug 69 that may be removable from the outer ring 32 after the gasket 20 is installed between flow conduit. For example, the product identification lug 69 includes one or more frangible thin sections for separating the lug 69 from the outer ring 32. As can be appreciated, the handling lugs 61, 63 and the identification lug 69 may be configured differently or may not be used with the outer ring 32 in other aspects.

The first outer sealing deformable layer 34 has an axial depth or thickness T5 and a radial length L5, and the second outer sealing deformable layer 36 has an axial depth or thickness T6 and a radial length L6. Illustrated in FIG. 2A, the first outer sealing deformable layer 34 and the second outer sealing deformable layer 36 have the same axial depth or thickness T5 and T6, respectively, and have the same radial lengths L5 and L6, respectively. The axial depth or thickness T5 of first outer sealing deformable layer 34 may be different than the axial depth or thickness T6 of the second outer sealing deformable layer 36. The first outer sealing deformable layer 34 and the second outer sealing deformable layer 36 are annular or circular in shape and sized to fit or rest on the upper and the lower surfaces 54 and 56, respectively, of the outer ring 32. The radial length L5 of the first outer sealing deformable layer 34 and the radial length L6 of the second outer sealing deformable layer 36 each span or extend from the inner face 58 of the outer ring 32 to the outside face 60 of the outer ring 32. As such, the upper surface 54 is covered with the first outer sealing deformable layer 34 and the lower surface 56 is covered with the second outer sealing deformable layer 36. Alternatively, radial length L5 of the first outer sealing deformable layer 34 is less than the radial length L4 of the upper surface 54, and the radial length L6 of the second outer sealing deformable layer 36 is less than the radial length L4 of the lower surface 56. As such, the upper surface 54 and the lower surface 56 include one or more outer grooves 50 and/or outer ridges 52 that are not covered with the first outer sealing deformable layer 34 and the second outer sealing deformable layer 36, respectively. Radial length L5 of the first outer sealing deformable layer 34 may be the same, less than, or greater than the radial length L6 of the second outer sealing deformable layer 36.

In the illustrated embodiment, axial depth or thickness T5 and T6 of the first outer sealing deformable layer 34 and the second outer sealing deformable layer 36, respectively, are uniform across the radial lengths L5 and L6, respectively, of the first and the second outer sealing deformable layers 34 and 36, respectively. The axial depth or thickness T5 and T6 of the first outer sealing deformable layer 34 and the second outer sealing deformable layer 36, respectively, are between about 0.5 millimeters to about 3.0 millimeters, and in one form axial depth or thickness T5 and T6 are each 0.75 millimeters. Alternatively, axial depth or thickness T5 and T6 of the first outer sealing deformable layer 34 and the second outer sealing deformable layer 36, respectively, are non-uniform and vary across the radial length L5 of the first outer sealing deformable layer 34 and the radial length L6 of the second outer sealing deformable layer 36, respectively. For example, the axial depth or thickness T5 and T6 of the first outer sealing deformable layer 34 and the second outer sealing deformable layer 36, respectively, may taper from a larger axial depth near the inner face 58 of the outer ring 32 to a smaller axial depth at the outside face 60 of the outer ring 32. Alternatively, the axial depth or thickness T5 and T6 of the first outer sealing deformable layer 34 and the second outer sealing deformable layer 36, respectively, may taper from a smaller axial depth near the inner face 58 of the outer ring 32 to a larger axial depth at the outside face 60 of the outer ring 32. The axial depth or thickness T5 of the first outer sealing deformable layer 34 can be greater, smaller, or vary in some other manner than the axial depth or thickness T6 of the second outer sealing deformable layer 36.

Materials for the first outer sealing deformable layer 34 and the second outer sealing deformable layer 36 include modified PTFE, flexible graphite, mica, silver, or another soft metal material, or a combination of any of these materials. By "soft" metal material it is meant a metal having a hardness less than 3.0 or less than copper on the Mohs hardness scale. The first outer sealing deformable layer 34 and the second outer sealing deformable layer 36 may be made from biaxially orientated sheet material containing PTFE and hollow glass microspheres under the tradename Matrix L104 sold by Lamons Gasket Company. The first outer sealing deformable layer 34 and the second outer sealing deformable layer 36 have compressibility between about 35% and 50% as measured by ASTM F36 Method J. The first outer sealing deformable layer 34 and the second outer sealing deformable layer 36 may be manufactured from modified PTFE and have compressibility of about 40%. The first outer sealing deformable layer 34 and the second outer sealing deformable layer 36 may be manufactured from flexible graphite and have compressibility between 30% and 40% and in one form about 43%. Additionally, the first outer sealing deformable layer 34 and the second outer sealing deformable layer 36 may be made of a fire resistant sealing material.

Figure 5:
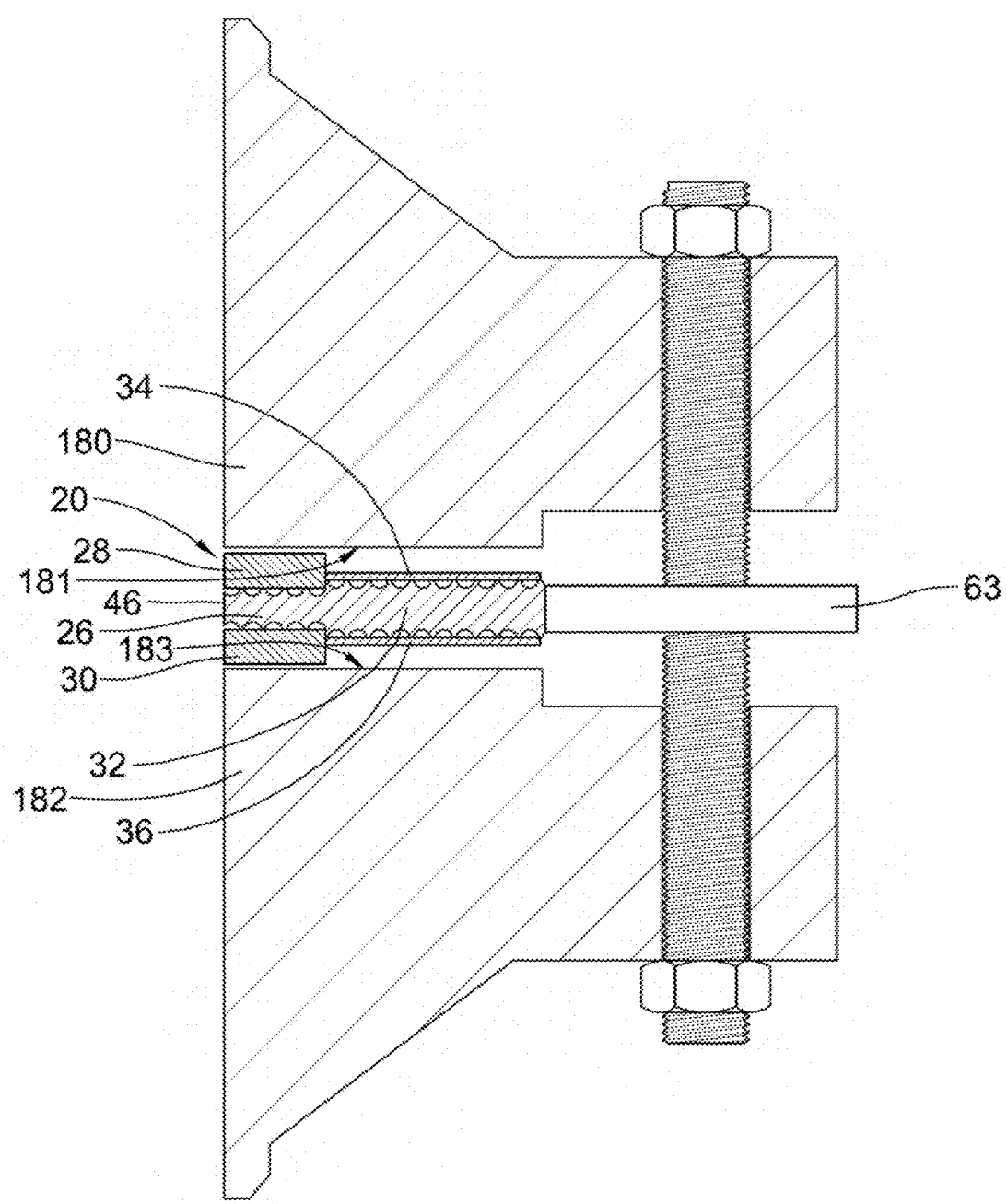
FIG. 5 is a partial cross-sectional view of the FIG. 1 gasket in a non-compressed configuration placed between flat flange faces of flow conduit sections.

In a non-compressed configuration of the gasket 20, illustrated in FIG. 5, the first inner sealing deformable layer 28 and the second inner sealing deformable layer 30 each extend to the inner face 46. The inner face 46 is aligned with the through bores of a first flow conduit flange 180 and a second flow conduit flange 182 to be joined. Also, in an initial non-compressed configuration of the gasket 20, the combined axial depth or thickness of the inner portion 22 that includes the axial depth T1 of the inner ring 26, the axial depth T3 of the first inner sealing deformable layer 28, and the axial depth T4 of the second inner sealing deformable layer 30 is greater or larger than the combined axial depth or thickness of the outer portion 24 that includes the axial depth T2 of the outer ring 32, the axial depth T5 of the first outer sealing deformable layer 34, and the axial depth T6 of the second outer sealing deformable layer 36. In this initial or a non-compressed configuration for the gasket 20, the combination of the axial depth or thickness T1, T3, and T4 is greater or larger than the combination of the axial depth or thickness T2, T5, and T6. An example non-compressed configuration for gasket 20 includes the axial depth or thickness T1 being about 2.0 millimeters, and axial depth T3 and axial depth T4 each being about 3.0 millimeters for a combined axial depth of about 8.0 millimeters for the inner portion 22. In this same non-compressed configuration for gasket 20, the axial depth or thickness T2 is about 3.0 millimeters, and axial depth T5 and axial depth T6 are each about 0.75 millimeters for a combined axial depth of about 4.5 millimeters for the outer portion 24.

Figure 6:
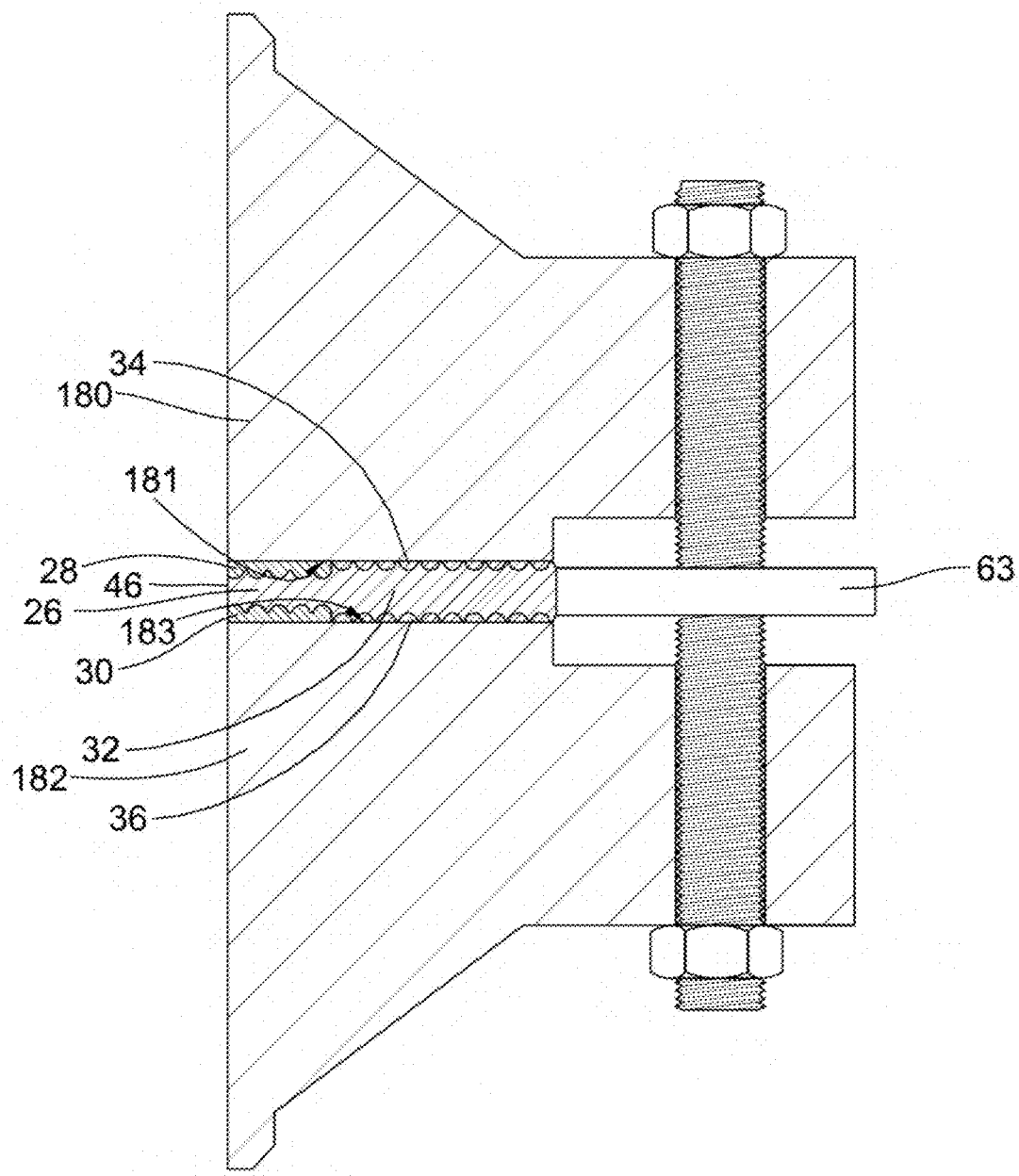
FIG. 6 is a view of the FIG. 5 embodiment in a compressed configuration placed between flat flange faces of joined flow conduit sections.

In a compressed configuration wherein the gasket 20 is compressed between the first flow conduit flange 180 and a second flow conduit flange 182, illustrated in FIG. 6, the combination of the axial depth or thickness T1, T3, and T4 may be the same or greater than the combination of the axial depth or thickness T2, T5, and T6. As such the first inner sealing deformable layer 28 and the second inner sealing deformable layer 30 may compress into or mold into the plurality of the inner grooves 38 and plurality of the inner ridges 40 along either, both of, or portions of the upper surface 42 and the lower surface 44. The first inner sealing deformable layer 28 and the second inner sealing deformable layer 30 may compress into or mold into the plurality of the inner grooves 38 and plurality of the inner ridges 40 in a uniform, non-uniform, variable, or some other manner such that all or a portion of the inner grooves 38 are filled with the first inner sealing deformable layer 28 and/or the second inner sealing deformable layer 30. Additionally, the first inner sealing deformable layer 28 and the second inner sealing deformable layer 30 which are more compressible or softer than the first outer sealing deformable layer 34 and the second outer sealing deformable layer 36 may compress into or mold and fill the crevices, pits, and other imperfections on a first flange face 181 of the first flow conduit flange 180 and a second flange face 183 of the second flow conduit flange 182, respectively. The first outer sealing deformable layer 34 and the second outer sealing deformable layer 36 may also compress into and mold into the plurality of the outer grooves 50 and plurality of the outer ridges 52. The first outer sealing deformable layer 34 and second outer sealing deformable layer 36 may compress in a uniform, non-uniform, variable, or some other manner such that all or a portion of the outer grooves 50 are filled.

Illustrated in FIGS. 7 and 8 are a first flow conduit flange 190 adjacent and aligned with a second flow conduit flange 192 with gasket 20 positioned there between. The first flange face 191 has a damaged area 194 wherein a portion of first flange face 191 was removed due to corrosion or some other means. Similarly, the second flange face 193 has a damaged area 196 wherein a portion of second flange face 193 was removed due to corrosion or some other means. The gasket 20 is placed between the first and the second flow conduit flanges 190 and 192 such that the inner face 46 is aligned with the through bores of the first and the second flow conduit flanges 190 and 192, respectively. As the first and the second flow conduit flanges 190 and 192, respectively, are joined together and a compressive force is applied to the first and the second flow conduit flanges 190 and 192, the softer, highly compressible first inner sealing deformable layer 28 and second inner sealing deformable layer 30 are pressed into the plurality of inner grooves 38 and over the plurality of inner ridges 40. The first inner sealing deformable layer 28 and/or the second inner sealing deformable layer 30 may fill all of the plurality of the inner grooves 38, a portion of one or more of the inner grooves 38, or all or some of the inner grooves 38. Further, the first inner sealing deformable layer 28 is molded into the damaged area 194 such that any pits or deformation of the first flow conduit flange 190 is filled with the first inner sealing deformable layer 28. Similarly, the second inner sealing deformable layer 30 is molded into the damaged area 196 such that any pits or deformation of the second flow conduit flange 192 is filled with the second inner sealing deformable layer 30. Compression of the first inner sealing deformable layer 28 continues until the first flange face 191 contacts the first outer sealing deformable layer 34 and compression of the second inner sealing deformable layer 30 continues until second flange face 193 contacts the second outer sealing deformable layer 36. After the first flange face 191 contacts the first outer sealing deformable layer 34 and the second flange face 193 contacts the second outer sealing deformable layer 36, compression of both the first inner sealing deformable layer 28 and the first outer sealing deformable layer 34 may continue but will be limited by the axial depth or thickness T2 of the outer ring 32, the axial depth or thickness T5 of the first outer sealing deformable layer 34, and the axial depth or thickness T6 of the second outer sealing deformable layer 36 as well as the type of material for each of these elements. The first and second outer sealing deformable layers 34 and 36 are compressed into the outer grooves 50 and the outer ridges 52. Therefore, the gasket 20 fills the gaps, or other damaged areas 194 and 196 to provide a fluid tight sealed connection once the appropriate loading is imparted by the first and second flow conduit sections 190 and 192, respectively.

The inner ring 26 may be coated or covered with a coating material to protect the inner ring 26 from corrosion attack from the pipeline media inside a wetted area or external corrosion attack from the surrounding environment such as the "splash" zone on an off-shore oil and gas production platform. Illustrated in FIG. 2B in a non-compressed configuration of the gasket 20, a coating 43 may be placed or applied onto one or more of the upper surface 42, the lower surface 44, and the inner face 46 of the inner ring 26 to further protect the inner ring 26 from corrosion or rust. The coating 43 covers the grooves 38 and the ridges 40 on the upper surface 42 and the lower surface 44. The coating 43 has an axial thickness that ranges from about 0.5 millimeters to about 1.5 millimeters, and in one aspect is about 1.0 millimeters. The coating 43 is applied and evenly distributed along the grooves 38 and the ridges 40 before the first inner sealing deformable layer 28 and the second inner sealing deformable layer 30 are applied to the upper surface 42 and the lower surface 44, respectively. The first inner sealing deformable layer 28 and the second inner sealing deformable layer 30 are applied on the coating 43. The coating 43 can also fully encapsulate the inner ring 26 and the outer ring 32. The outer ring 32 may be coated or covered with a coating material to protect the outer ring 32 similar to the inner ring 26. Illustrated in FIG. 2B, a coating 43 may be placed or applied onto one or more of the upper surface 54, the lower surface 56, the inner face 58, and the outside face 60 of the outer ring 32 to further protect the outer ring 32 from corrosion or rust. The coating 43 covers the outer grooves 50 and the outer ridges 52. The coating 43 has an axial thickness that ranges from about 0.5 millimeters to about 1.5 millimeters, and in one aspect is about 1.0 millimeters. The coating 43 is applied and evenly distributed along the outer grooves 50 and the outer ridges 52 before the first outer sealing deformable layer 34 and the second outer sealing deformable layer 36 are applied to the upper surface 54 and the lower surface 56, respectively.

The coating 43 may be made from a fluorocarbon or fluoropolymer based coating material sold under the trademark XYLAN® 1424 by Whitford Corporation, composites of fluoropolymers and reinforcing binder resins, polytetrafluoroethylene, polymers, or other inorganic sealants, or a combination of these materials. In one form, the coating 43 is made of an electrically non-conductive material and beneficially ensures that if the two mating pipe flanges are made of different materials or have different material properties, then the coating 43 being applied to the inner ring 26 and the outer ring 32 will electrically isolate the two pipe flanges from each other at the gasket boundary. Moreover, the first inner sealing deformable layer 28, the second inner sealing deformable layer 30, the first outer sealing deformable layer 34, and the second outer sealing deformable layer 36 are also electrically inert; therefore, by isolating the connection bolts with sleeves and the connection nuts with isolation washers for the connecting pipe flanges, the gasket 20 may be used to electrically isolate adjacent pipe flanges even where flange face corrosion has occurred.

One unique aspect of the gasket 20 is the inner ring 26 has the alternating sequence of a plurality of the inner grooves 38 and a plurality of the inner ridges 40 along the upper surface 42 to form a kammprofile, corrugated, Corrukamm™ of Lamons Gasket Company, or serrated profile that retains the first inner sealing deformable layer 28 on the inner ring 26 and reduces or minimizes lateral movement of the first inner sealing deformable layer 28 relative to the inner ring 26 such that the first inner sealing deformable layer 28 will not become dislodged or flushed down the flow conduit after the gasket 20 is inserted between facing flanges during operation of the flow conduit. Similarly, the inner ring 26 having the alternating sequence of a plurality of the inner grooves 38 and a plurality of the inner ridges 40 along the lower surface 44 forms a kammprofile, corrugated, Corrukamm™, serrated, or other roughened surface profile that beneficially retains the second inner sealing deformable layer 30 on the inner ring 26 to reduce or minimize lateral movement of the second inner sealing deformable layer 30 such that the second inner sealing deformable layer 30 will not become dislodged or flushed down the flow conduit after the gasket 20 is inserted between facing pipe flanges.

Beneficially the alternating sequence of the plurality of the inner grooves 38 and the plurality of the inner ridges 40 along the upper surface 42 and the lower surface 44 of the inner ring 26 grip or engage and retain the first and the second inner sealing deformable layers 28 and 30, respectively, to prevent the first and the second inner sealing deformable layers 28 and 30 from cold-flowing, creeping, or extruding radially while being compressed when the gasket 20 is assembled with the flange faces of a flow conduit pipeline. Another benefit of the alternating sequence of a plurality of the inner grooves 38 and a plurality of the inner ridges 40 along the upper surface 42 and the lower surface 44 of the inner ring 26 is that the first and the second inner sealing deformable layers 28 and 30, respectively, when compressed are secured to the inner ring 26 by keying or interlocking and thereby form a mechanical bond between the first and the second inner sealing deformable layers 28 and 30 and the inner ring 26. A chemical bond occurs when the sealing layers are adhered with an adhesive or other chemical substance to the upper and lower surfaces of an inner or outer ring to retain sealing layers thereon. A mechanical bond is advantageous over a chemical bond in the situation that the gasket 20 is used for higher pressure classes of pipe flanges to prevent extrusion or blowout of the sealing material wherein the sealing material is partially or completely dislodged and/or is extruded from the pipe joint when the gasket 20 is assembled with the flow conduit. The gasket 20 may be used with any of the flow conduit with class rating designations 150, 300, 400, 600, 900, 1500, and 2500 as rated by the Piping Class Ratings based on the ASME B16.5 Pipe Flanges and Flanged Fittings. The profiles of the upper surface 42 and the lower surface 44 may be different from each other, the same, or the profiles may vary along the radial length L1. Additionally, the profiles on the upper surface 42 and the lower surface 44 of the inner ring 26 may vary from the profiles on the upper surface 54 and the lower surface 56 of the outer ring 32. The profiles may be different on the inner and outer rings 26 and 32, respectively, and on the upper surfaces 42 and 54 and the lower surfaces 44 and 56.

Moreover during the sealing and installation of the gasket 20 between pipe flanges, the first inner sealing deformable layer 28 and the second inner sealing deformable layer 30 made of a highly compressible material are each forced or squeezed into respective gaps or inner grooves 38 between the inner ridges 40 on the upper surface 42 and the lower surface 44, respectively, of the inner ring 26 to improve sealing by inducing stress concentrations on the sealing surfaces. For clarification and consistency throughout the application, a "highly compressible" material shall be a material that will deflect from a greater thickness to a lesser thickness more than another material with the same load per unit area applied. Additionally, the axial depth or thickness T3 of the first inner sealing deformable layer 28 and the axial depth or thickness T4 of the second inner sealing deformable layer 30 are thick or large enough to also compress into or mold and fill in the crevices, pits, or any other imperfections in the flow conduit flange faces to further improve the seal between the flow conduit and the gasket 20.

Another beneficial aspect of the gasket 20 is the inner ring 26 being made of metal and having an alternating sequence of the plurality of the inner grooves 38 and the plurality of the inner ridges 40 along the upper surface 42 and the lower surface 44, respectively, which strengthens the inner portion 22 and further stabilizes and retains the first inner sealing deformable layer 28 on the upper surface 42 and the second inner sealing deformable layer 30 on the lower surface 44 of the inner ring 26 in a compressed configuration by forming a mechanical bond therebetween. In a compressed configuration, the first inner sealing deformable layer 28 interlocks or keys with the upper surface 42 and the second inner sealing deformable layer 30 interlocks or keys with the lower surface 44 of the inner ring 26 to form a mechanical bond. The inner ring 26 being made of metal also provides corrosion resistance, durability, strength, and is easily manufactured in many environments.

Another beneficial aspect of the gasket 20 is the outer ring 32 being made of metal and having an alternating sequence of the plurality of the outer grooves 50 and the plurality of the outer ridges 52 along the upper surface 54 and along the lower surface 56, respectively, strengthens the outer portion 24 and further stabilizes and retains the first outer sealing deformable layer 34 on the upper surface 54 and the second outer sealing deformable layer 36 on the lower surface 56 of the outer ring 32 when the gasket 20 is in a compressed configuration by forming a mechanical bond therebetween. In a compressed configuration, the first outer sealing deformable layer 34 compresses or molds to thereby interlock or key with the upper surface 54 and the second outer sealing deformable layer 36 also compresses or molds to thereby interlock or key with the lower surface 56 of the outer ring 32 to form a mechanical bond. The outer ring 32 made of metal also provides corrosion resistance, durability, strength, and is easily manufactured in many environments.

The thicker metal outer ring 32 wherein the axial depth T2 is greater than the axial depth T5 of the first outer sealing deformable layer 34, the axial depth T6 of the second outer sealing deformable layer 36, and the axial depth T1 of the inner ring 26, enables the flow conduit flanges to withstand the force required to close the flow conduit with the gasket 20 positioned therebetween without potentially further damaging the flow conduit flanges. The first outer sealing deformable layer 34 and the second outer sealing deformable layer 36 also help eliminate or reduce any potential damage on the flow conduit flange faces when closing and sealing the flow conduit flange faces with the gasket 20 positioned therebetween.

As discussed above, the inner portion 22 has a larger overall axial depth or thickness as compared to the overall axial depth or thickness of the outer portion 24 of the gasket 20. In a preassembled or an assembled configuration in which the gasket 20 is placed between two flow conduit flanges, illustrated in FIGS. 5, 6, 7, and 8, the gasket 20 is configured such that the location of the thicker, more compressible first and second inner sealing deformable layers 28 and 30, respectively, on the inner ring 26 are positioned adjacent the bore of the flow conduit flanges and the thinner, less compressible first outer sealing deformable layer 34 and the second outer sealing deformable layer 36 on the outer ring 32 are positioned radially outward from the inner ring 26. This configuration in which the first and second inner sealing deformable layers 28 and 30, respectively, are positioned close to the flow conduit flange bore enables the first and the second sealing deformable layers 28 and 30 to conform, mold into, compress, or become pliant against the first and second flange faces 191 and 193 and damaged areas 194 and 196. This is especially advantageous when the flange faces 191 and 193 are corroded or damaged as the first and second inner sealing deformable layers 28 and 30 compress into, mold into, and fill the crevices, pits, and other imperfections on the first and second flange faces 191 and 193 as illustrated in FIG. 8. The first and the second sealing deformable layers 28 and 30 are highly compressible which also enables these layers 28 and 30 to flow or mold into and fill the plurality of the inner grooves 38 and cover the plurality of the inner ridges 40 along the upper surface 42 and the lower surface 44, respectively, when the gasket 20 is inserted between opposing flange faces of flow conduit sections and compressed as illustrated in FIGS. 6 and 8. The compression of the first and the second sealing deformable layers 28 and 30 is limited by the type of material chosen for these layers and is further limited by compression of the first outer sealing deformable layer 34, compression of the second outer sealing deformable layer 36, and the axial depth T2 of the outer ring 32.

One method of manufacturing the gasket 20 includes forming the plurality of inner grooves 38 and the plurality of inner ridges 40 on the upper surface 42 and the lower surface 44, respectively, of a metal ring with a suitable groove profiler machine to create the inner ring 26. Similarly, the groove profiler machine will create the plurality of outer grooves 50 and the plurality of outer ridges 52 on the upper surface 54 and the lower surface 56 of the same metal ring to create the outer ring 32 wherein the outer grooves 50 and the outer ridges 52 are not cut as deep as the inner grooves 38 and the inner ridges 40 of the inner ring 26. As such, the axial depth T2 of the outer ring 32 is larger than the axial depth T1 of the inner ring 26. In one embodiment, the inner ring 26 and the outer ring 32 are made of stainless steel. The coating 43 may be placed or applied onto one or more of the upper surface 42, the lower surface 44, and the inner face 46 of the inner ring 26 to further protect the inner ring 26 from corrosion or rust. The coating 43 may be placed or applied onto one or more of the upper surface 54, the lower surface 56, the inner face 58, and the outside face 60 of the outer ring 32 to further protect the outer ring 32 from corrosion. A layer of adhesive may be applied to the upper surface 42 and the lower surface 44 of the inner ring 26. Thereafter the first inner sealing deformable layer 28 is placed on the adhesive on the upper surface 42 and the second inner sealing deformable layer 30 is placed on the adhesive on the lower surface 44. Lastly a layer of adhesive may be applied to the upper surface 54 and the lower surface 56 of the outer ring 32. The layer of adhesive is applied to either or both of the inner ring 26 and the outer ring 32 to maintain the first inner sealing deformable layer 28, the second inner sealing deformable layer 30, the first outer sealing deformable layer 34, and the second outer sealing deformable layer 36 in place during installation; however, the adhesive is not necessary for a chemical bond or any structural strength to the gasket 20. Thereafter, the first outer sealing deformable layer 34 is placed on the adhesive on the upper surface 54 and the second outer sealing deformable layer 36 is placed on the adhesive on the lower surface 44.

Figure 3A:
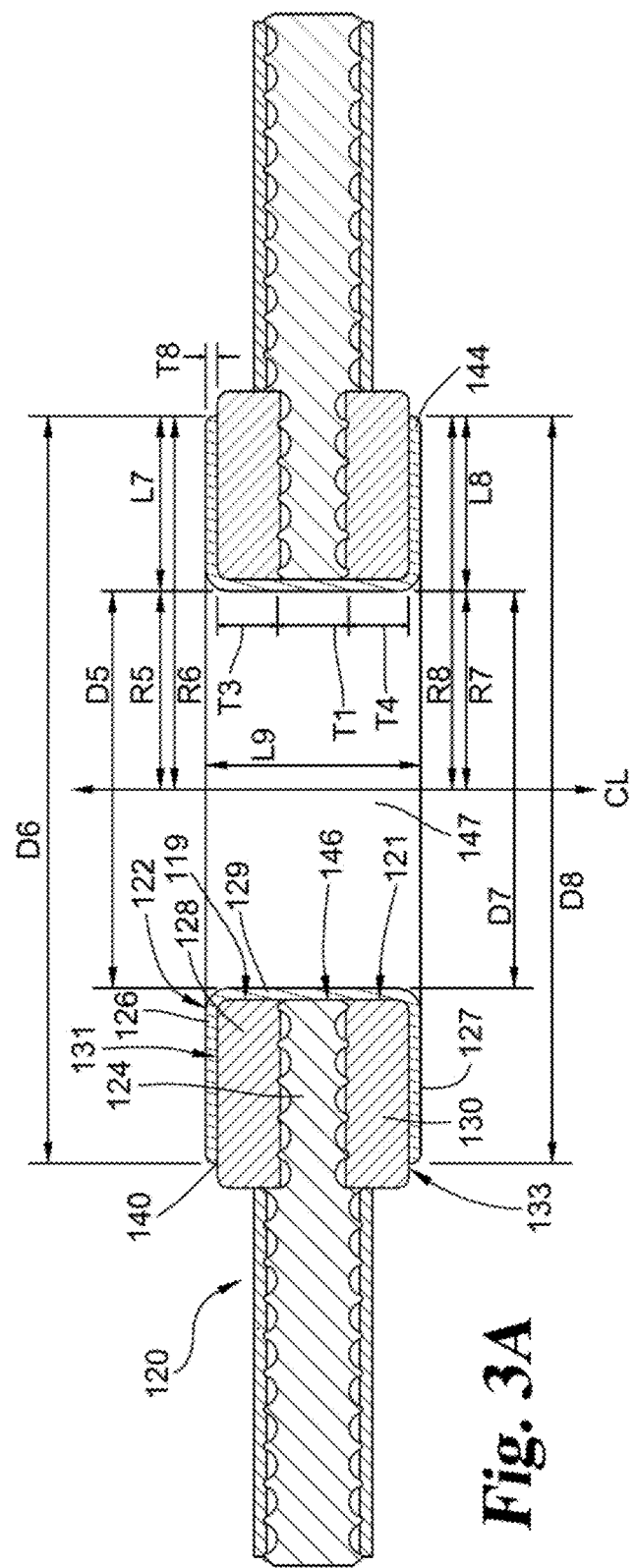
FIG. 3A is a cross-sectional view of a gasket according to the present disclosure.

A cross-sectional view of a gasket 120 is illustrated in FIG. 3A in a nominal state. Gasket 120 is similar to gasket 20 and further includes a deformable sealing envelope 122 that covers and contacts a portion of a first inner sealing deformable layer 128, a portion of a second inner sealing deformable layer 130, and an inner face 146 of an inner ring 124. The first inner sealing deformable layer 128 having a first edge 119 and the second inner sealing deformable layer 130 having a second edge 121 are aligned with the inner face 146 of the inner ring 124. Therefore for the sake of brevity similar features as gasket 20 will not be described again for gasket 120.

Turning now to the deformable sealing envelope 122, the sealing envelope 122 includes an upper portion 126, a lower portion 127, and a middle portion 129 that spans between the upper portion 126 and the lower portion 127. When the sealing envelope 122 is assembled or attached to the inner ring 124, the upper portion 126 partially covers an exterior surface 131 of the first inner sealing deformable layer 128, the lower portion 127 partially covers an exterior surface 133 of the second inner sealing deformable layer 130, and the middle portion 129 fully contacts the inner face 146 of the inner ring 124. The upper portion 126 forms an inside diameter D5 and an outside diameter D6 wherein an inside radius R5 is measured from a center CL of the inner ring 124 to the middle portion 129 that covers the inner face 146 and an outside radius R6 is measured from the center CL of the inner ring 124 to an end 140 of the upper portion 126. The upper portion 126 has a radial length L7 that spans between the end 140 and the middle portion 129 that covers the inner face 146. The lower portion 127 forms an inside diameter D7 and an outside diameter D8 wherein an inside radius R7 is measured from the center CL of the inner ring 124 to the middle portion 129 that covers the inner face 146 and an outside radius R8 is measured from the center CL of the inner ring 124 to an end 144 of the lower portion 127. The lower portion 127 has a radial length L8 that spans between the end 144 and the middle portion 129 that covers the inner face 146. The radial length L7 may be the same or different than the radial length L8. The middle portion 129 covers the axial depth or thickness T3 of the first inner sealing deformable layer 128 and the middle portion 129 also covers the axial depth or thickness T4 of the second inner sealing deformable layer 130. The middle portion 129 has an axial length L9 that corresponds to the axial depth or thickness T3 and T4 and the axial depth or thickness T1 of the inner ring 124. The middle portion 129 over the inner face 146 of the inner ring 124 defines an aperture 147 that is substantially similar to or the same size as the diameter or aperture of the through bores of the flange faces to which the gasket 120 will be inserted such that the middle portion 129 over the inner face 146 of the inner ring 124 is flush with the through bores of the flange faces. The middle portion 129 may alternatively extend into the flange bore in an assembled configuration as desired.

The sealing envelope 122 may be made of sintered virgin PTFE or other compressible materials. The sealing envelope 122 has a thickness T8 that may range from about 0.5 millimeters to about 2.0 millimeters and in one form is 0.6 millimeters. The sealing envelope 122 covers the inner face 146 of the inner ring 124 and protects the inner ring 124 from contact with the fluid media flowing through the conduit, and enables a more lamina type flow for the media across the flange area to reduce flange face erosion. The sealing envelope 122 also helps to secure the first inner sealing deformable layer 128 and the second inner sealing deformable layer 130 to the inner ring 124. The first inner sealing deformable layer 128 and the second inner sealing deformable layer 130 may be made of expanded PTFE or non-expanded PTFE.

A cross-sectional view of a gasket 220 is illustrated in FIG. 3B in a nominal state. Gasket 220 is similar to gasket 120 illustrated in FIG. 3A and further includes a deformable sealing envelope 222 that covers and contacts the first inner sealing deformable layer 128, the second inner sealing deformable layer 130, and the inner face 146 of the inner ring 124. Therefore for the sake of brevity similar features will not be described again for gasket 220.

The deformable sealing envelope 222 is similar to the sealing envelope 122 however the sealing envelope 222 is radially longer than the sealing envelope 122. As such the sealing envelope 222 covers or wraps over the first inner sealing deformable layer 128 and covers or wraps over the second inner sealing deformable layer 130. The sealing envelope 222 includes an upper end portion 225, an upper portion 226, a lower portion 227, a lower end portion 228, and a middle portion 229 that spans between the upper portion 226 and the lower portion 227. When the sealing envelope 222 is assembled or attached to the gasket 220, the upper portion 226 fully covers the exterior surface 131 of the first inner sealing deformable layer 128, the lower portion 227 fully covers the exterior surface 133 of the second inner sealing deformable layer 130, and the middle portion 229 fully contacts the inner face 146 of the inner ring 124. Additionally, the upper end portion 225 extends from the upper portion 226 and along the axial depth or thickness T3 of the first inner sealing deformable layer 128 until the upper end portion 225 engages and contacts the first outer sealing deformable layer 34. The upper end portion 225 wraps over the first inner sealing deformable layer 128. Similarly, the lower end portion 228 extends from the lower portion 227 and along the axial depth or thickness T4 of the second inner sealing deformable layer 130 until the lower end portion 228 engages and contacts the second outer sealing deformable layer 36. The lower end portion 228 wraps over the second inner sealing deformable layer 130.

The upper portion 226 forms an inside diameter D5 and an outside diameter D10 wherein an inside radius R5 is measured from a center CL of the inner ring 124 to the middle portion 229 that covers the inner face 146 and an outside radius R9 is measured from the center CL of the inner ring 124 to an edge 240 of the first inner sealing deformable layer 128. The upper portion 226 has a radial length L10 that spans from the edge 240 to the middle portion 229 that covers the inner face 146. The lower portion 227 forms an inside diameter D7 and an outside diameter D11 wherein an inside radius R10 is measured from the center CL of the inner ring 124 to the middle portion 229 that covers the inner face 146 and an outside radius R11 is measured from the center CL of the inner ring 124 to an edge 244 of the second inner sealing deformable layer 130. The lower portion 227 has a radial length L11 that spans from the edge 244 to the middle portion 229 that covers the inner face 146. The middle portion 229 is similar to the middle portion 129. The upper end portion 225 has an axial length AL1 that spans from the exterior surface 131 of the first inner sealing deformable layer 128 to the first outer sealing deformable layer 34. The lower end portion 228 has an axial length AL2 that spans from the exterior surface 133 of the second inner sealing deformable layer 130 to the second outer sealing deformable layer 36.

A cross-sectional view of a gasket 320 is illustrated in FIG. 3C in a nominal state. Gasket 320 is similar to gasket 120 illustrated in FIG. 3A therefore for the sake of brevity similar features will not be described again. Gasket 320 includes a deformable sealing envelope 322 that is similar to the deformable sealing envelope 122; however, the deformable sealing envelope 322 is manufactured in two separate pieces which are then attached together. The deformable sealing envelope 322 may be similar to the deformable sealing envelope 222 illustrated in FIG. 3B. Deformable sealing envelope 322 includes a first portion 324 that is assembled onto the first inner sealing deformable layer 128 and a second portion 326 that is assembled onto the second inner sealing deformable layer 130. The first portion 324 includes a first contact edge 328 and the second portion 326 includes a second contact edge 330 wherein the first and the second contact edges 328 and 330 are configured to match or align with each other. The first contact edge 328 and the second contact edge 326 may be connected in various manners such as welding along line WL, an adhesive, or other techniques known in the industry.

A cross-sectional view of a gasket 420 is illustrated in FIG. 4A in a nominal state. Gasket 420 is similar to gasket 20 in all aspects except that a deformable sealing envelope 422 replaces the first inner sealing deformable layer 28 and the second inner sealing deformable layer 30 on the inner ring 26. Therefore for the sake of brevity similar features will not be described again for gasket 420.

Turning now to the deformable sealing envelope 422, the sealing envelope 422 is a single piece of material that is wrapped around the inner ring 26 to form an upper portion 426, a middle portion 428, and a lower portion 430. The upper portion 426 has a radial length L15 that spans across the radial length L1 of the inner ring 26 and contacts the inner face 58 of the outer ring 32. The radial length L15 of the upper portion 426 may be shorter wherein the upper portion 426 does not contact the inner face 58 of the outer ring 32. Similarly, the lower portion 430 has a radial length L16 that spans across the radial length L1 of the inner ring 26 and contacts the inner face 58 of the outer ring 32. The radial length L16 of the lower portion 430 may be shorter wherein the lower portion 430 does not contact the inner face 58 of the outer ring 32. The middle portion 428 spans across the inner face 46 of the inner ring 26. The deformable sealing envelope 422 is made of expanded PTFE. The deformable sealing envelope 222 may be made of expanded PTFE sold under the tradename Matrix L120 by Lamons Gasket Company. Beneficially, the deformable sealing envelope 422 encapsulates the inner ring 26 which protects the inner ring 26 from contact with the pipeline media when the gasket 420 is placed between flow conduit flange faces. The deformable sealing envelope 422 creates an envelope shield for the inner ring 26. The middle portion 428 is aligned with the through bore of the flow conduit when the gasket 420 is placed between mating flow conduit flange faces. In any configuration, the smallest internal diameter on the gasket 420 may be matched to suit the bore of the intended flow conduit flange face.

A cross-sectional view of a gasket 520 is illustrated in FIG. 4B in a nominal state. Gasket 520 is similar to gasket 420 in all aspects except that an inner ring 526 and a deformable sealing envelope 522 are configured differently from the inner ring 26 and the deformable sealing envelope 422, respectively. Therefore for the sake of brevity similar features will not be described again for gasket 520.

The inner ring 526 has an axial depth or thickness T1 that spans between an upper surface 542 and a lower surface 544. The inner ring 526 includes an inner face 546 that has a recess or groove 548 that spans circumferentially around the inner face 546. The recess or groove 548 is configured and sized to receive a nub 560 on the deformable sealing envelope 522. The recess or groove 548 may be positioned equidistantly between the upper surface 542 and the lower surface 544 or closer to one of either the upper surface 542 or the lower surface 544.

The deformable sealing envelope 522 is positioned or wrapped around the inner ring 526 to form an upper portion 526, a middle portion 528, and a lower portion 530. The middle portion 528 spans across the inner face 546 of the inner ring 526. The middle portion 528 includes a nub 560 that is correspondingly sized to fit in the recess or groove 548 of the inner ring 526. In one form, the nub 560 and the recess or groove 548 each have a triangular shape that are sized and shaped such that the nub 560 nests with the recess or groove 548. Beneficially, the nub 560 on deformable sealing envelope 522 engages with the recess or groove 548 to further connect or attach the deformable sealing envelope 522 to the inner ring 526 to create an additional region or node of contact between the deformable sealing envelope 522 and the inner ring 526.

Figure 4C:
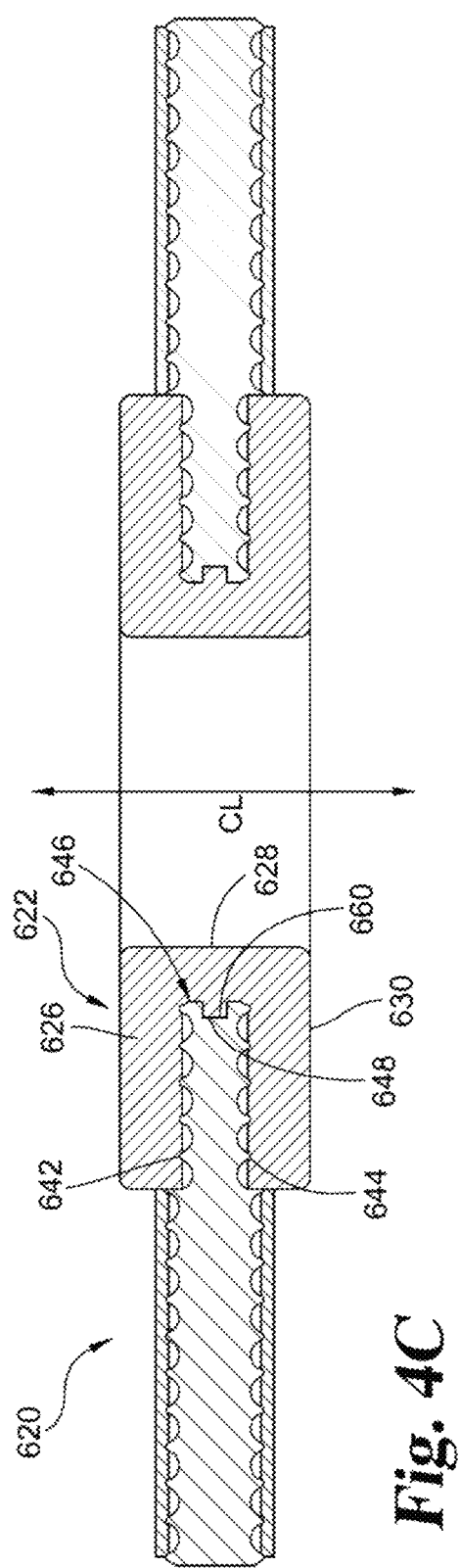
FIG. 4C is a cross-sectional view of a gasket according to the present disclosure.

A cross-sectional view of a gasket 620 is illustrated in FIG. 4C in a nominal state. Gasket 620 is similar to gasket 620 in all aspects except that an inner ring 626 and a deformable sealing envelope 622 are configured differently from the inner ring 526 and the deformable sealing envelope 522, respectively. Therefore for the sake of brevity similar features will not be described again for gasket 620.

The inner ring 626 has an inner face 646 that has a recess or groove 648 that spans circumferentially around the inner face 646. The recess or groove 648 is configured and sized to receive a nub 660 on the deformable sealing envelope 622. The recess or groove 648 may be positioned equidistantly between an upper surface 642 and a lower surface 644 or closer to one of either the upper surface 642 or the lower surface 644.

The deformable sealing envelope 622 is positioned or wrapped around the inner ring 626 to form an upper portion 626, a middle portion 628, and a lower portion 630. The middle portion 628 includes a nub 660 that is correspondingly sized to fit in the recess or groove 648 of the inner ring 626. The nub 660 and the recess or groove 648 each have a square or rectangular shape that are sized and shaped such that the nub 660 nests with the recess or groove 648. Beneficially, the nub 660 on deformable sealing envelope 622 engages with the recess or groove 648 to further connect or attach the deformable sealing envelope 622 to the inner ring 626 to create an additional region or node of contact between the deformable sealing envelope 622 and the inner ring 626.

Figure 9:
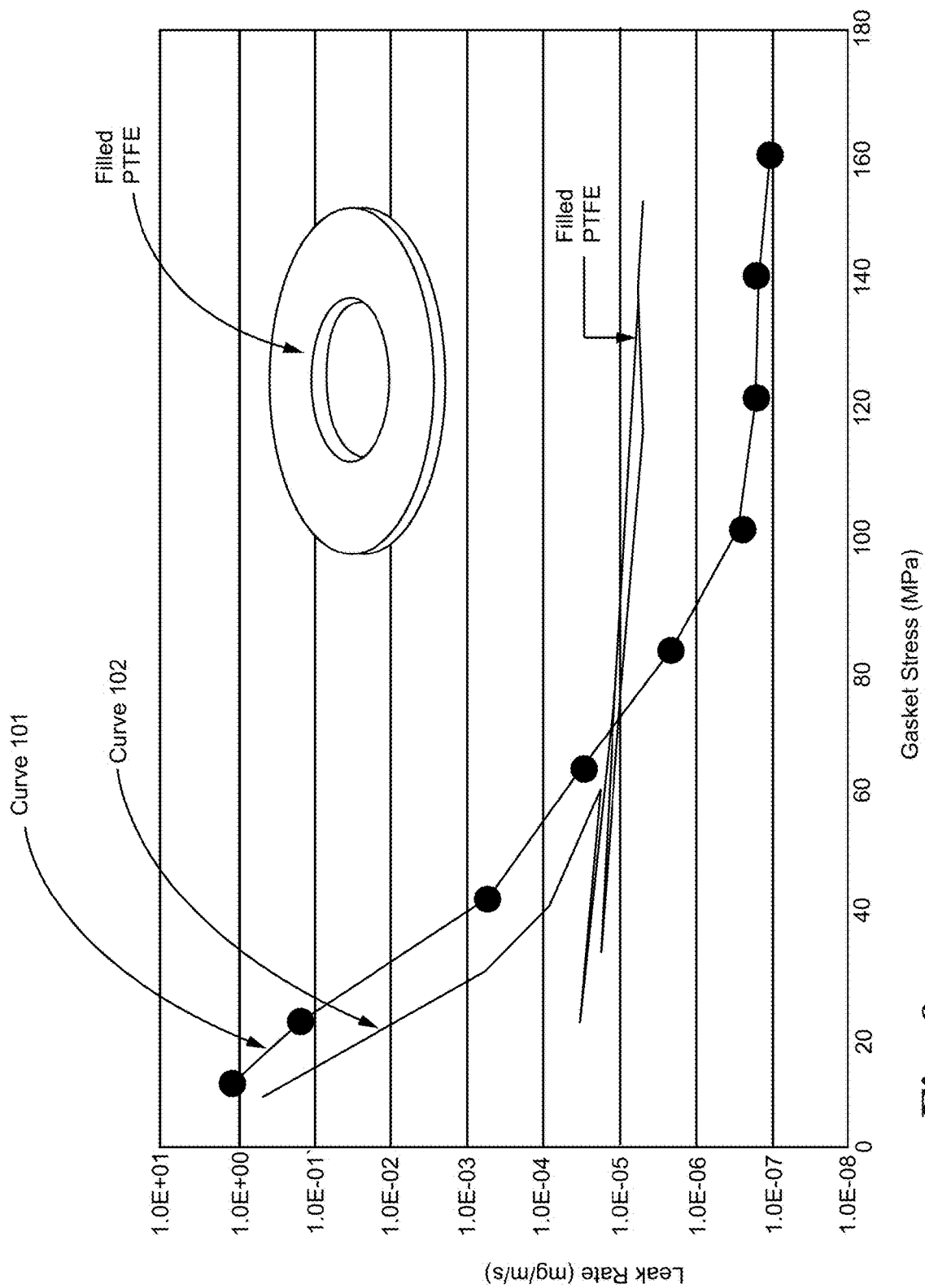
FIG. 9 is a graph of test results of the gasket according to FIG. 1 and a 2.0 millimeter thick gasket made of PTFE placed between flat plates.

The applicant has tested the gasket 20 and found that the gasket 20 results in a better seal between flow conduit flange faces and provides for a much better seal when the flow conduit flange faces are corroded as compared to a similarly sized 2.0 millimeter thick gasket made of PTFE, labeled "Filled PTFE" and illustrated in FIG. 9. In all of the tests, the gasket 20 included the first inner sealing deformable layer 28 and the second inner sealing deformable layer 30 made from expanded PTFE material. The results of the tests are illustrated in FIGS. 9, 10, 11, 12, and 13, and discussed below.

FIG. 9 illustrates the test results labeled curve 101 wherein the gasket 20 is tested between flat plates wherein the flat plates have a smooth surface. The test results for a 2.0 millimeter thick gasket made of PTFE are labeled Curve 102 and are the base comparison for FIGS. 10, 11, and 12. The Leak Rate measures the amount of gas escaping through the gasket as the load is applied to flat plates to compress the gasket positioned between the flat plates. The Gasket Stress is the amount of clamping load applied to the gasket positioned between the flat plates. The gasket 20 tested at 40 Bar (He) leaked less than the 2.0 millimeter thick gasket made of PTFE once the gasket stress increased above 70 MPa (10,153 psi). As the gasket stress increased from 70 MPa to 160 MPa, the gasket 20 continued to leak less than the 2.0 millimeter thick gasket made of PTFE.

Figure 10:
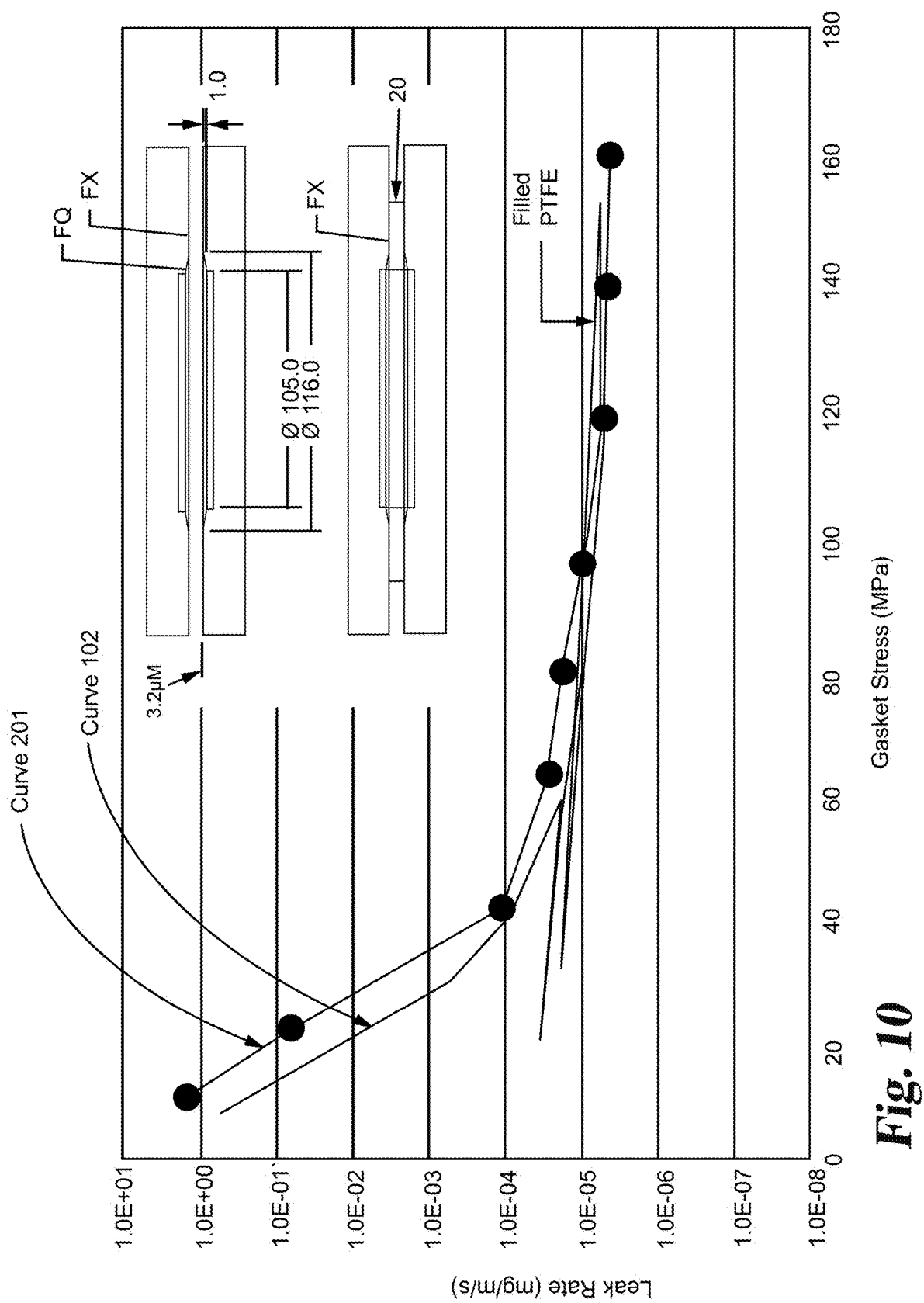
FIG. 10 is a graph of test results of the gasket according to FIG. 1 between flange faces having a 1.0 millimeter roughened surface that extends half way across the flange faces.

FIG. 10 illustrates the test results with the gasket 20 tested between two flange faces FX with 1.0 millimeter of roughened surface FQ that extends half way across both of the flange faces FX. The roughened surface FQ of the flange faces FX represent corrosion that can occur to flow conduit flanges. The rest results for gasket 20 are labeled Curve 201. Also illustrated in FIG. 10 is the Filled PTFE gasket placed between flat plates and labeled Curve 102 (same as FIG. 9). The tightness data or Leak Rate for Curve 201 is very close to that Curve 101 from FIG. 9. The sealing integrity of Curve 201 almost or completely replicates the Curve 102 as the gasket stress increases from about 80 MPa to 160 MPa.

Figure 11:
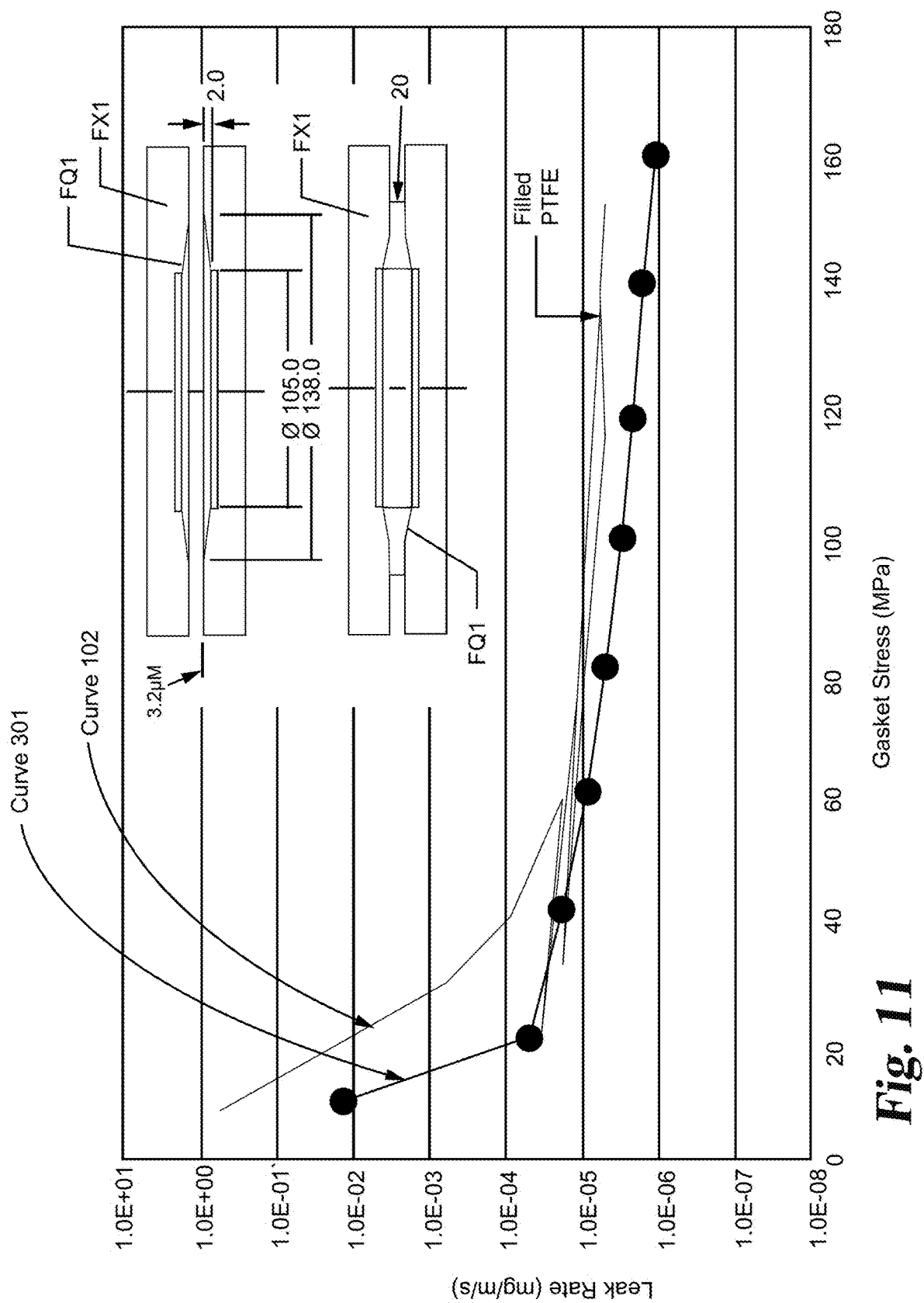
FIG. 11 is a graph of test results of the gasket according to FIG. 1 placed between flange faces having a 2.0 millimeter roughened surface that extends half way across the flange faces.

FIG. 11 illustrates the test results with the gasket 20 tested between two flange faces FX1 with 2.0 millimeter of corrosion or roughened surface FQ1 that extends half way across both of the flange faces FX1. The roughened surface FQ1 of the flange faces FX1 represent corrosion that can occur to flow conduit flanges. The rest results for gasket 20 are labeled Curve 301. Also illustrated in FIG. 11 is the Filled PTFE gasket placed between flat plates labeled as Curve 102. The gasket 20 leaked more than the 2.0 millimeter thick gasket made of PTFE; however, the sealing integrity replicates the 2.0 millimeter thick gasket made of PTFE and the tightness is maintained with increased flange face damage. Beneficially, there is no deterioration in sealing performance of gasket 20.

Figure 12:
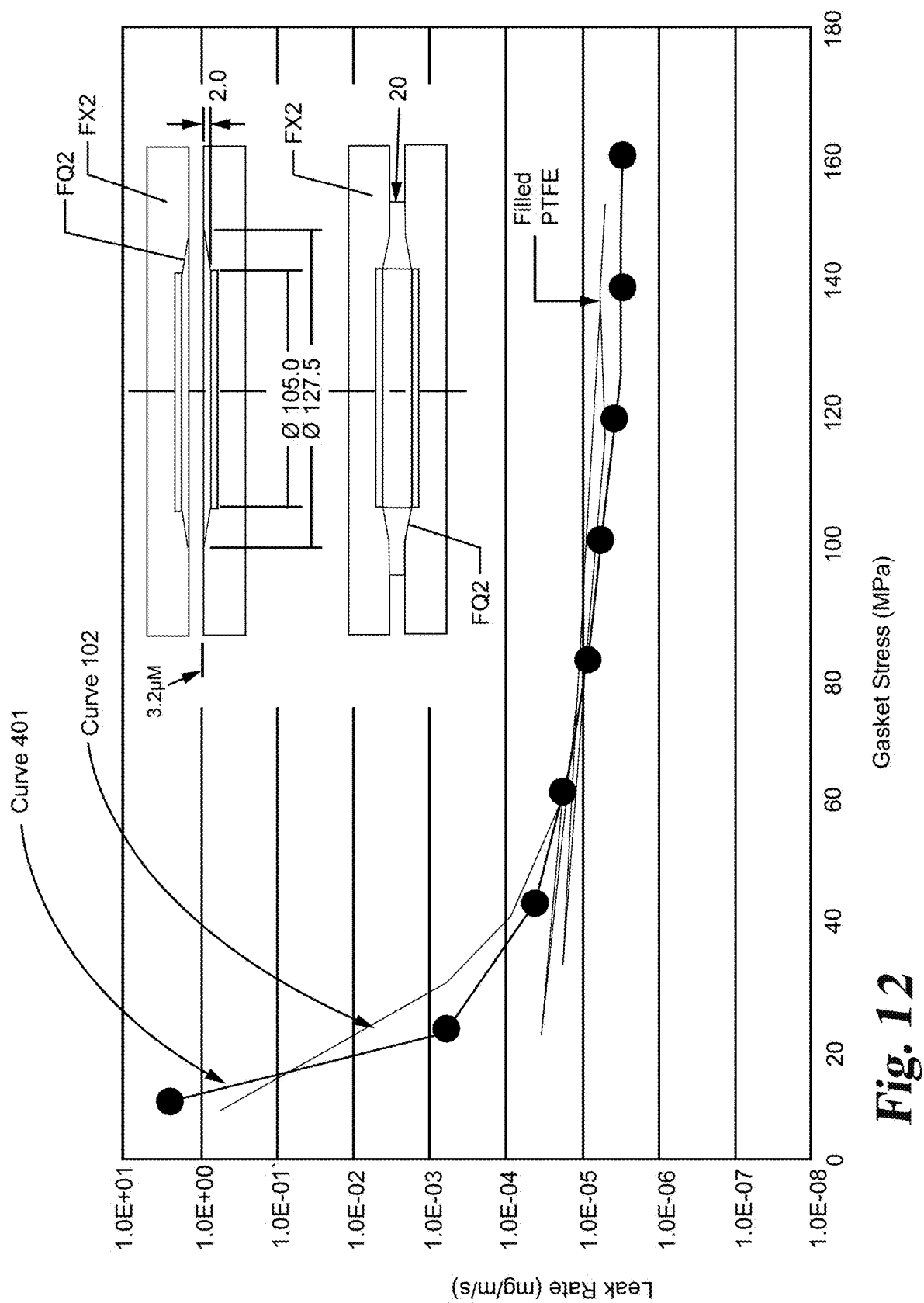
FIG. 12 is a graph of test results of the gasket according to FIG. 1 placed between flange faces having a 2.0 millimeter roughened surface that extends all the way across the flange faces.

FIG. 12 illustrates the test results with the gasket 20 tested between two flange faces FX2 with 2.0 millimeter of corrosion or roughened surface FQ2 that extends all the way across both of the flange faces FX2. The roughened surface FQ2 of the flange faces FX2 represent corrosion that can occur to flow conduit flanges and is illustrated as FQ2 in FIG. 12. The test results for gasket 20 are labeled Curve 401. Also illustrated in FIG. 12 is the Filled PTFE gasket placed between flat plates labeled as Curve 102. The tightness data for Curve 401 is as good or about the same as the Curve 101 in FIG. 9. The sealing integrity of gasket 20 in corroded flanges of a flow conduit almost replicates the 2.0 millimeter thick gasket made of PTFE between flat plates. The tightness is maintained with increased flange face damage replicated with roughened surface FQ2, wherein the flange face damage is increased from half the face (FQ1) in FIG. 11 to entire face (FQ2) in FIG. 12.

Figure 13:
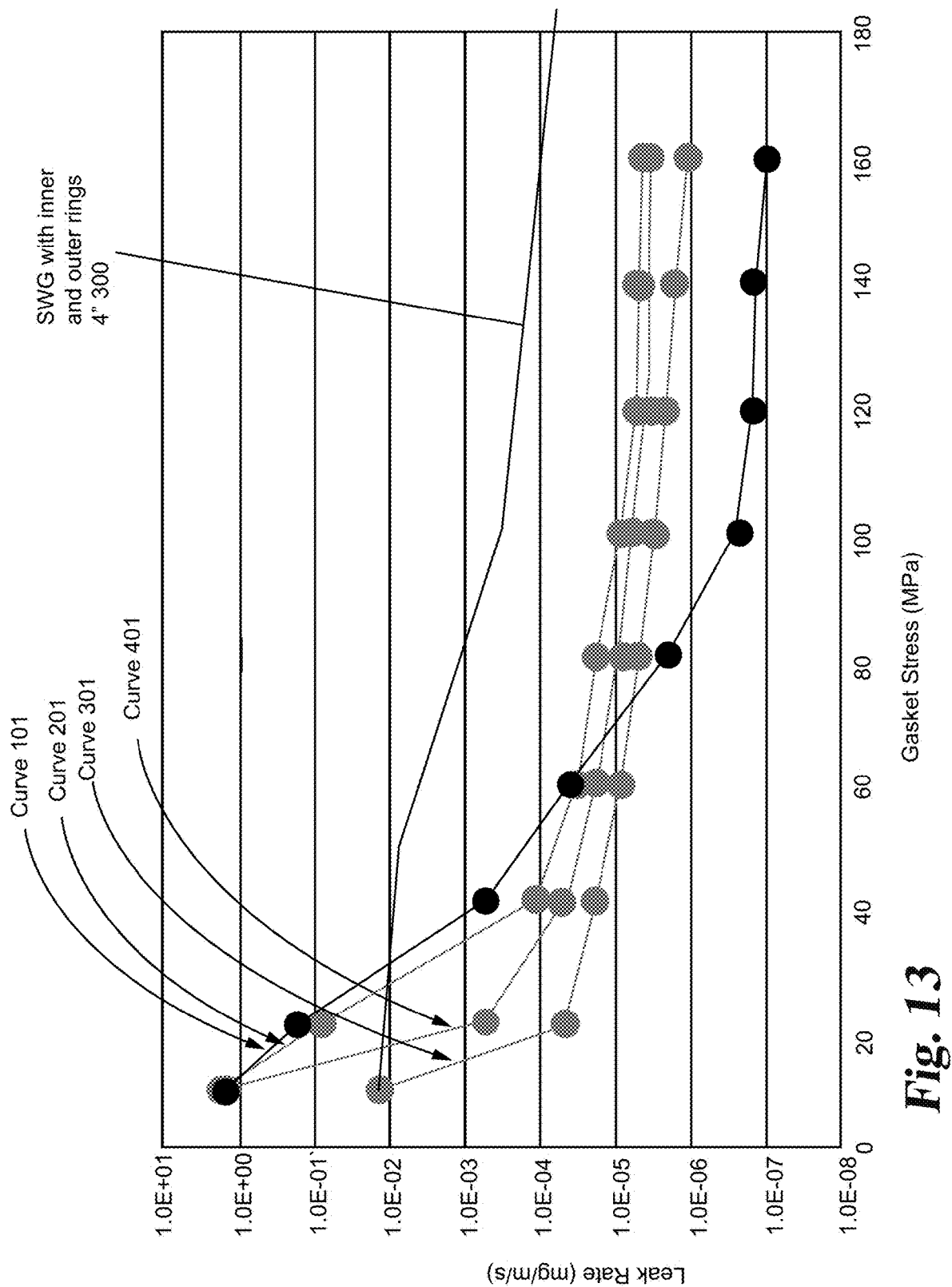
FIG. 13 is a graph of test results of the gasket according to FIG. 1 and a 4 inch-300 type spiral wound gasket having an inner ring and an outer ring placed between flange faces and tested at ambient conditions.

FIG. 13 illustrates a 4" 300 type spiral wound gasket SWG having an inner ring and an outer ring and compared this spiral wound gasket SWG to gasket 20 previously tested in FIGS. 9, 10, 11, and 12. The SWG was placed between flat plates and tested. The gasket 20 placed between progressively damaged flange faces seals at least 10 times better than the spiral wound gasket SWG having an inner ring and an outer ring placed between the flat plates at equivalent gasket stresses.

In summary, the gasket 20 leaked about the same or less than a 2.0 millimeter thick gasket made of PTFE or a spiral wound gasket SWG wherein either the PTFE gasket or SWG gasket is placed between flat plates and loaded an equivalent load as gasket 20. The leak rate of gasket 20 decreased or stayed about the same when the simulated flange face corrosion was introduced and increased across the flange faces. The gasket 20 sealed about the same as 2.0 millimeter thick gasket made of PTEF placed between flat plates. The gasket 20 sealed better than the spiral wound gasket SWG placed between flat plates. The tightness of the gasket 20 is maintained under increasing simulated flange face corrosion.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A gasket having an annular ring shape for sealing two mating surfaces, the gasket comprising:
   an inner portion defining an aperture and having an inner ring positioned between a first inner sealing deformable layer and a second inner sealing deformable layer, the inner ring having an upper surface opposite a lower surface, the inner ring having an alternating sequence of inner grooves and inner ridges along the upper surface and the lower surface, wherein the first inner sealing deformable layer is positioned on the upper surface and the second inner sealing deformable layer is positioned on the lower surface; and
   an outer portion positioned exterior and concentric to the inner portion, the outer portion having an outer ring positioned between a first outer sealing deformable layer and a second outer sealing deformable layer, wherein the inner portion has a non-compressed axial thickness that is greater than a non-compressed axial thickness of the outer portion;
   wherein the outer ring has an upper surface opposite a lower surface, the outer ring having an alternating sequence of outer grooves and outer ridges along the upper surface and the lower surface of the outer ring, wherein the first outer sealing deformable layer is positioned on the upper surface and the second outer sealing deformable layer is positioned on the lower surface; and
   wherein the inner ring is positioned adjacent to the outer ring.

2. A gasket having an annular ring shape for sealing two mating surfaces, the gasket comprising:
   an inner ring defining an aperture and having an upper surface opposite a lower surface and an inner face that spans between the upper and the lower surfaces, the inner ring having an alternating sequence of inner grooves and inner ridges along the upper surface and the lower surface;
   a first inner sealing deformable layer positioned on the upper surface of the inner ring, the first inner sealing deformable layer configured to compress into the inner grooves when a compressive force is applied to the first inner sealing deformable layer;
   a second inner sealing deformable layer positioned on the lower surface of the inner ring, the second inner sealing deformable layer configured to compress into the inner grooves when a compressive force is applied to the second inner sealing deformable layer; and
   an outer ring positioned exterior, concentric, and adjacent to the inner ring, the outer ring having an upper surface opposite a lower surface and an outside face that spans between the upper surface and the lower surface;
   a coating applied on the upper surface, lower surface, and the outside face of the outer ring;
   a first outer sealing deformable layer positioned over the coating on the upper surface of the outer ring; and
   a second outer sealing deformable layer positioned over the coating on the lower surface of the outer ring.

3. The gasket of claim 2 wherein the inner ring has an axial thickness that is less than an axial thickness of the outer ring.

4. A gasket having an annular ring shape for sealing two mating surfaces, the gasket comprising:
   an inner ring defining an aperture and having an upper surface opposite a lower surface, the inner ring having an alternating sequence of inner grooves and inner ridges along the upper surface and the lower surface of the inner ring;
   a first inner sealing deformable layer positioned on the upper surface of the inner ring, the first inner sealing deformable layer configured to compress into the inner grooves when a compressive force is applied to the first inner sealing deformable layer;
   a second inner sealing deformable layer positioned on the lower surface of the inner ring, the second inner sealing deformable layer configured to compress into the inner grooves when a compressive force is applied to the second inner sealing deformable layer;
   an outer ring positioned exterior and concentric to the inner ring, the outer ring having an upper surface opposite a lower surface, the outer ring having an alternating sequence of outer grooves and outer ridges along the upper surface and the lower surface of the outer ring, wherein the inner ring has an axial thickness that is less than an axial thickness of the outer ring;
   a first outer sealing deformable layer positioned on the upper surface of the outer ring, the first outer sealing deformable layer configured to compress into the outer grooves when a compressive force is applied to the first outer sealing deformable layer; and
   a second outer sealing deformable layer positioned on the lower surface of the outer ring, the second outer sealing deformable layer configured to compress into the outer grooves when a compressive force is applied to the second outer sealing deformable layer.

5. The gasket of claim 4 wherein the outer ring is positioned adjacent to the inner ring.

6. The gasket of claim 1, wherein the first and the second inner sealing deformable layers each have a compressibility between about 40% and about 70%, and the first and the second outer sealing deformable layers each have a compressibility between about 35% and about 50%.

7. The gasket of claim 1, wherein a non-compressed axial thickness of the first and the second inner sealing deformable layers is greater than a non-compressed axial thickness of the first and the second outer sealing deformable layers.

8. The gasket of claim 1, wherein a non-compressed axial thickness of the outer ring is greater than a non-compressed axial thickness of the inner ring.

9. The gasket of claim 1, wherein the inner ring and the outer ring are fabricated out of a metal material.

10. A method of sealing two substantially parallel surfaces, comprising:
 positioning between the two substantially parallel surfaces a gasket according to claim 1; and
 securing the two substantially parallel surfaces together to thereby deform the two inner sealing deformable layers against the two substantially parallel surfaces.

11. The gasket of claim 1, further comprising:
 a sealing envelope having an upper portion, a lower portion, and a middle portion that spans between the upper portion and the lower portion, wherein the upper portion contacts the first inner sealing deformable layer, the lower portion contacts the second inner sealing deformable layer, and the middle portion contacts an inner face of the inner ring.

12. The gasket of claim 1, wherein the upper portion has a radial length that is shorter than a radial length of the first inner sealing deformable layer.

13. The gasket of claim 1, wherein the first inner sealing deformable layer and the second inner sealing deformable layer are made of expandable PTFE or flexible graphite, or a combination of these materials.

14. The gasket of claim 2, wherein the inner ring and the outer ring are fabricated out of a metal material.

15. The gasket of claim 2, wherein the first inner sealing deformable layer and the second inner sealing deformable layer are fabricated out of expanded PTFE or flexible graphite material, or a combination of these materials.

16. The gasket of claim 2, wherein the first and the second outer sealing deformable layers are fabricated out of modified PTFE, biaxially orientated/microcellular PTFE, flexible graphite, mica, or silver material, or a combination of these materials.

17. The gasket of claim 2, wherein the coating is also applied on the alternating sequence of inner grooves and inner ridges along the upper surface, the lower surface, and the inner face of the inner ring.

18. The gasket of claim 2, wherein the inner ring has an axial thickness that is less than an axial thickness of the outer ring.

19. The gasket of claim 4, wherein the first inner sealing deformable layer and the second inner sealing deformable layer are configured to compress a greater amount than the first outer sealing deformable layer and the second outer sealing deformable layer when a compressive force is applied to both of the first and the second inner sealing deformable layers and a compressive force is applied to both of the first and the second outer sealing deformable layers.

20. The gasket of claim 4, wherein the first and the second inner sealing deformable layers are configured to compress and fill a portion of the inner grooves of the upper surface and the lower surface, respectively, of the inner ring, and the first and the second outer sealing deformable layers are configured to compress and fill a portion of the outer grooves of the upper and the lower surfaces, respectively, of the outer ring.

21. The gasket of claim 4, wherein the first and the second inner sealing deformable layers are configured to compress and fill all of the inner grooves of the upper surface and the lower surface, respectively, of the inner ring.

22. The gasket of claim 4, wherein the first and the second inner sealing deformable layers have a compressibility between about 40% and about 70%.

23. The gasket of claim 4, wherein the outer ring is positioned adjacent to the inner ring.

* * * * *